United States Patent [19]
Tessier et al.

[11] Patent Number: 5,902,177
[45] Date of Patent: May 11, 1999

[54] APPARATUS AND METHOD FOR REMOVING RIBS

[75] Inventors: Clément Tessier, Terrebonne; François Beaumont, Laval; Jacques Cardinal, Frelighsburg; Didier Conte, Montreal; Sylvain Larocque, Rivière-des-Prairies; Pierre Turcotte, Beaconsfield, all of Canada

[73] Assignee: Centre de Recherche Industrielle Du Québec, Montreal, Canada

[21] Appl. No.: 09/044,433

[22] Filed: Mar. 19, 1998

[30] Foreign Application Priority Data

Mar. 20, 1997 [CA] Canada .................................. 2200545

[51] Int. Cl.⁶ .................................................. A22C 17/00
[52] U.S. Cl. ......................... 452/156; 452/157; 452/158; 452/171
[58] Field of Search ..................... 452/156, 155, 452/157, 158, 171

[56] References Cited

U.S. PATENT DOCUMENTS

| | | | |
|---|---|---|---|
| 3,546,737 | 12/1970 | Neebel et al. | 452/157 |
| 4,557,019 | 12/1985 | Van Deuanter et al. | 452/157 |
| 5,205,779 | 4/1993 | O'Brien et al. | 452/155 |
| 5,580,306 | 12/1996 | Young et al. | 452/157 |
| 5,746,648 | 5/1998 | Boeyen et al. | 452/156 |

*Primary Examiner*—Willis Little
*Attorney, Agent, or Firm*—David M. Carter; Guy J. Houle

[57] ABSTRACT

The apparatus for automatically removing ribs portion from belly of a beast flank, such as pork flank, comprises a conveyor provided with gripping hooks for holding the flank in position on the conveyor during ribs portion removing, a camera disposed over flank top surface showing ribs for generating image electrical signals representing an image of the flank top surface, a laser triangulation unit for generating surface profile data characterizing the flank top surface, a pair of lateral cameras for generating ribs thickness data for the ribs and analyzing device such as computer for receiving the image electrical signals, surface profile data and ribs thickness data for deriving therefrom a programmed cut profile according to a predetermined meat thickness to be left under the ribs. The apparatus further comprises a robot having a robot arm provided with a end cutting tool, and a programmable logic controller (PLC) for controlling the conveyor and the robot, to create a relative movement of the cutting tool with respect to the flank according to the programmed cut profile to produce removal of the ribs portion from the belly.

25 Claims, 14 Drawing Sheets

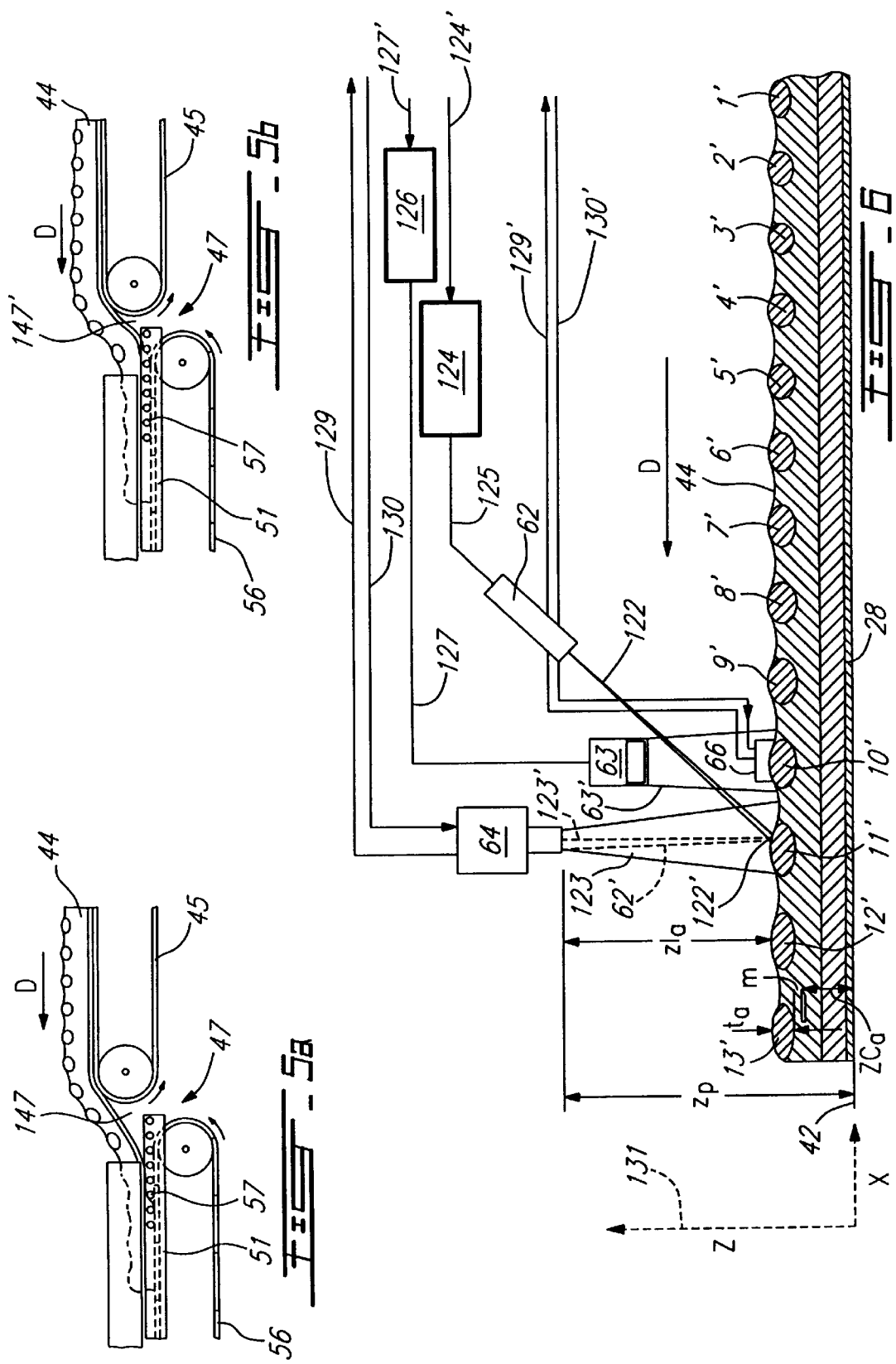

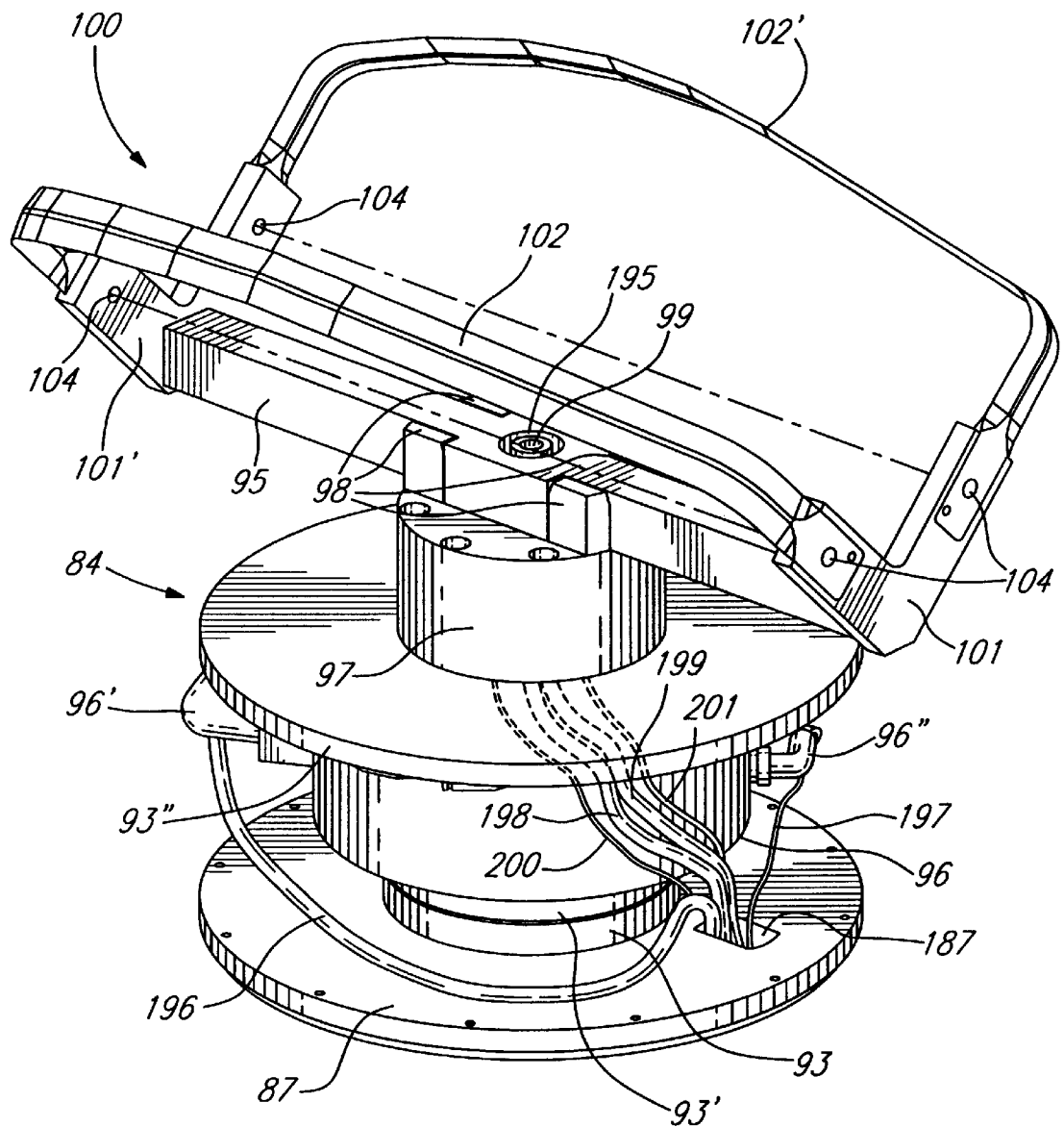

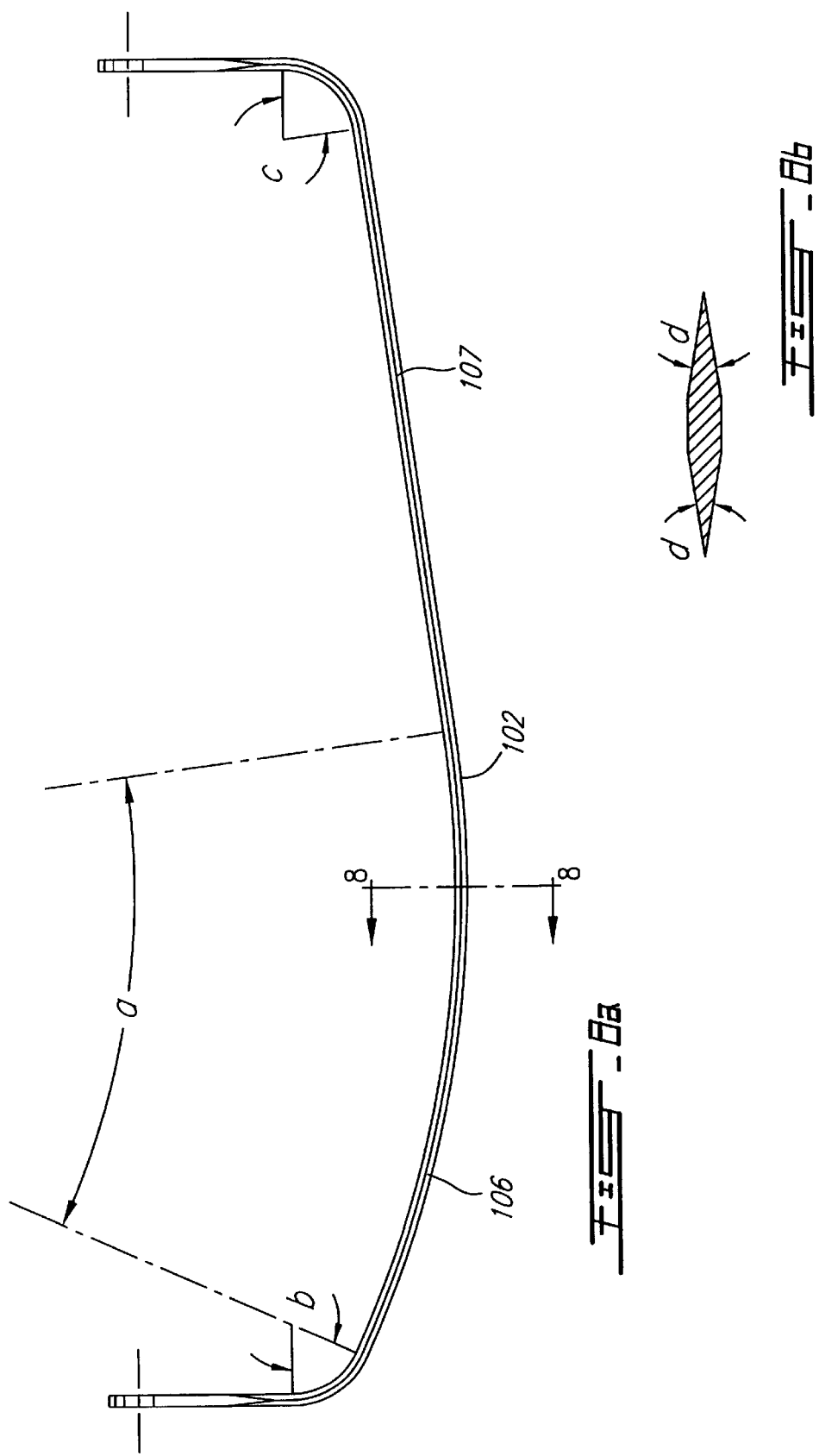

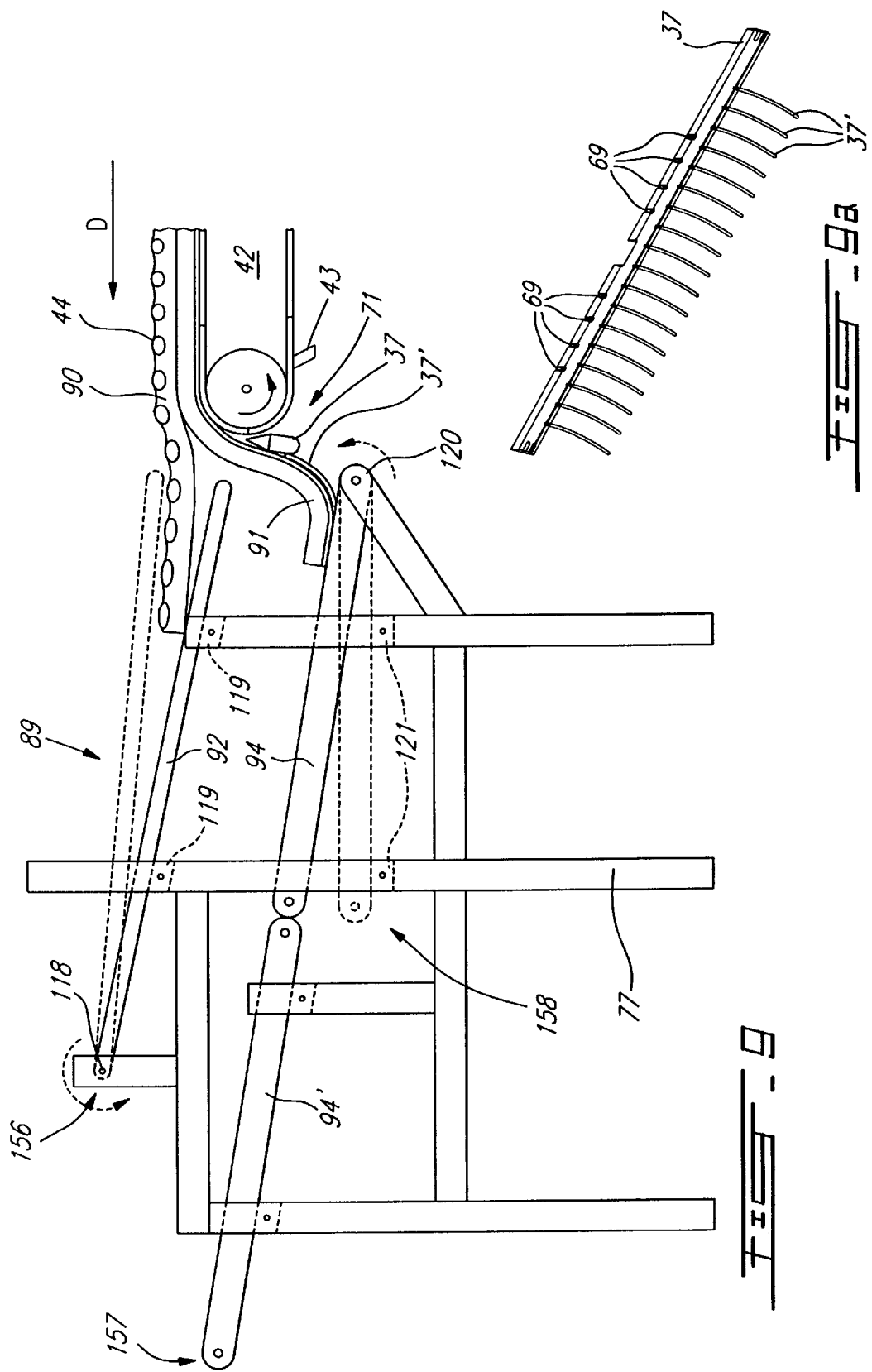

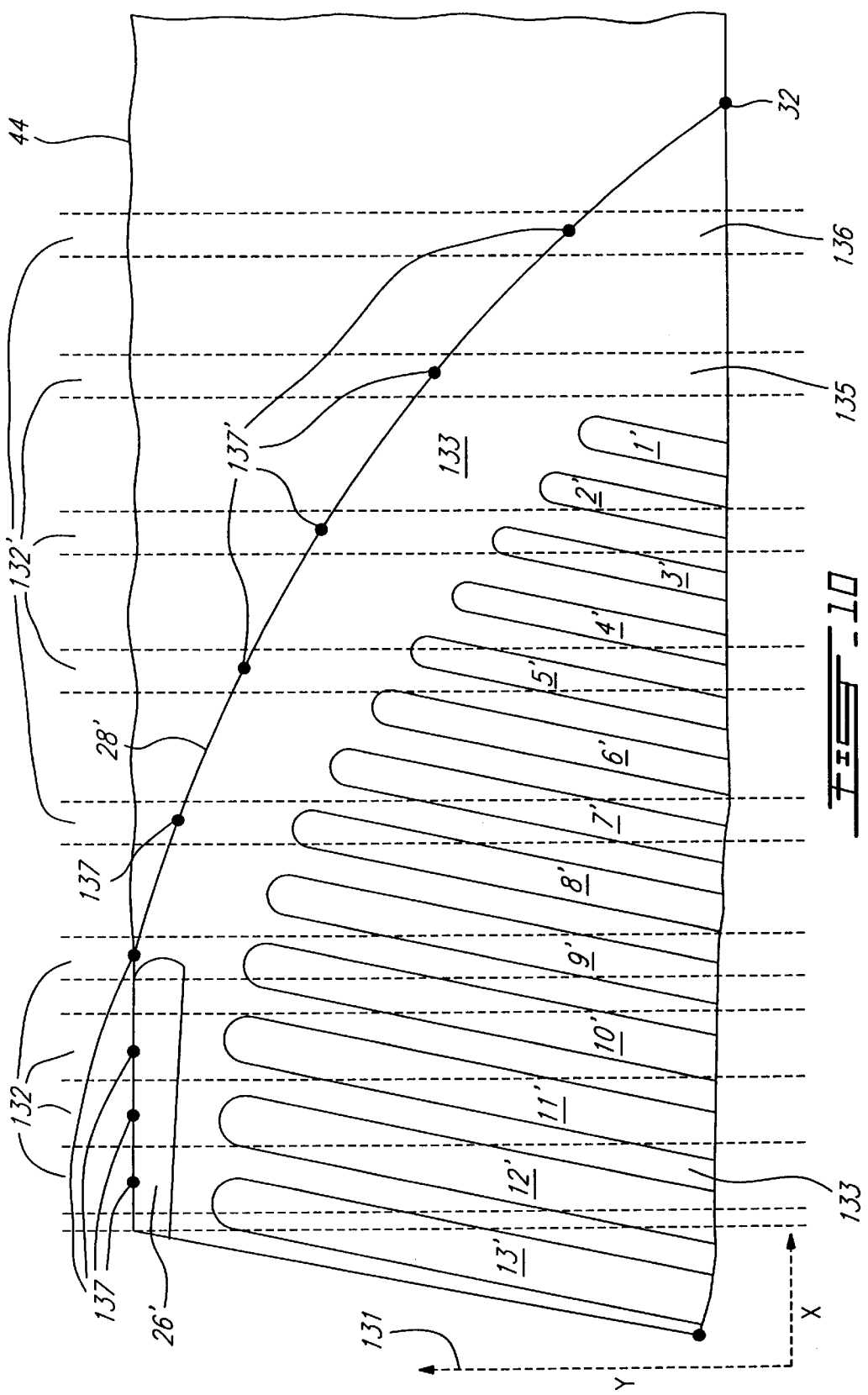

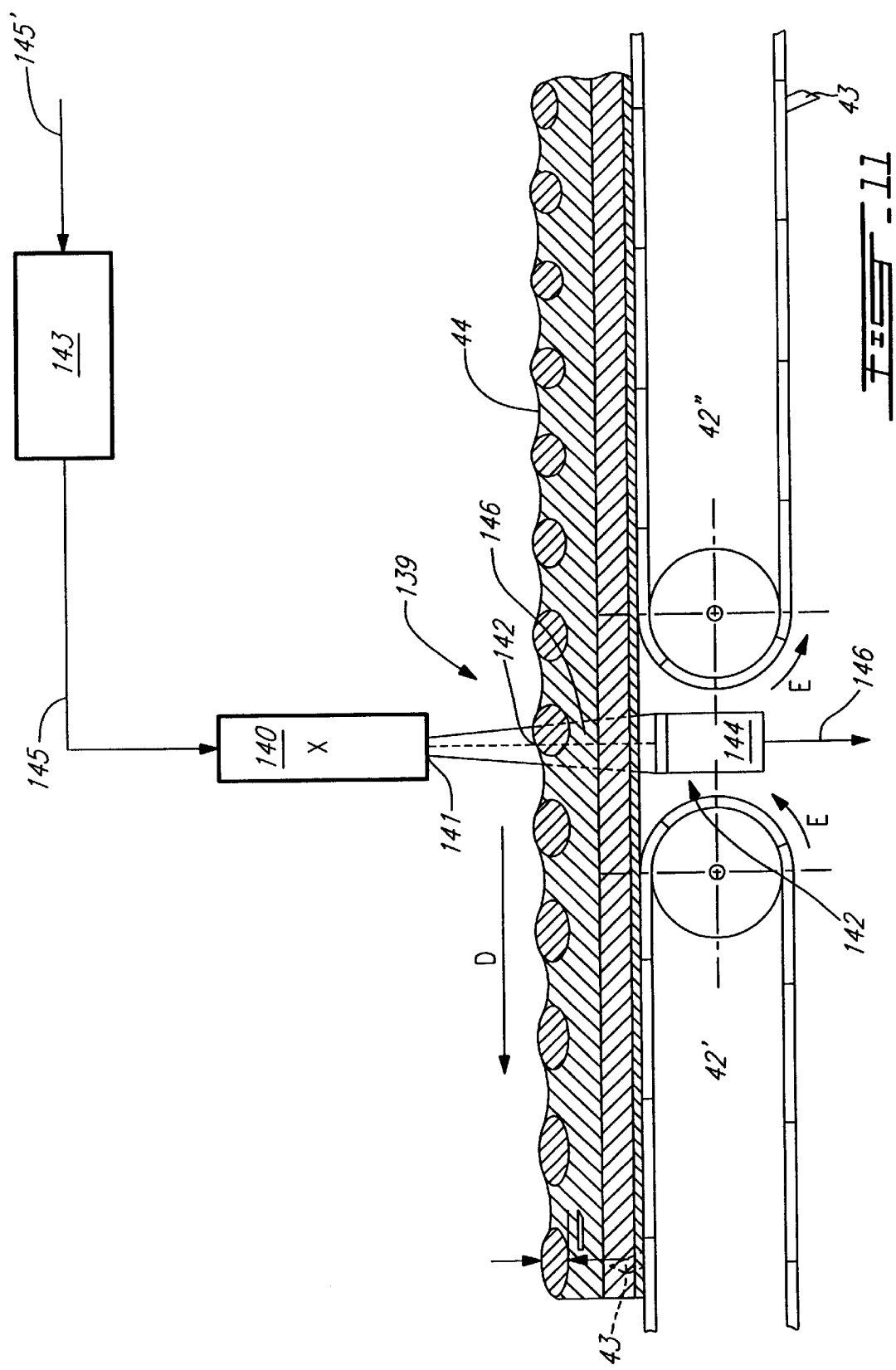

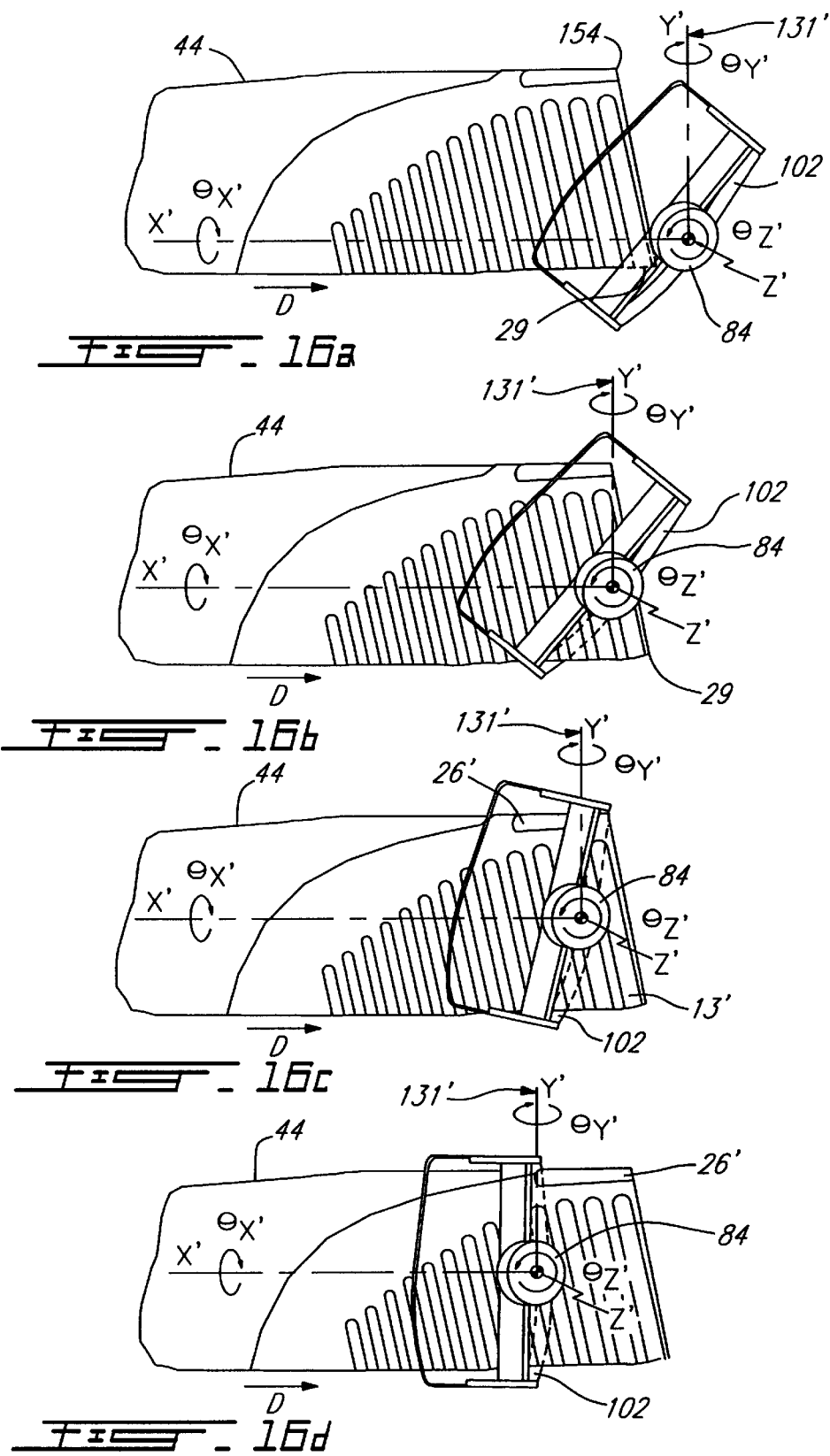

APPARATUS AND METHOD FOR REMOVING RIBS

FIELD OF INVENTION

The present invention relates to automated apparatus for meat cutting, and particularly to an apparatus for removing ribs from bellies of animal flanks, such as pork flanks.

BACKGROUND ART

In slaughterhouses, after eviscerating, beheading and chilling, livestock carcasses are, as a first primal cutting step, separated through the spine in two halves of carcass, which are then further processed to obtain other primal cuts. In pork slaughtering, such further primal cuts include hind and front foot, ham, shoulder, loin, back ribs, spare ribs and flank, the latter being further cut to remove spare ribs portion from belly. Heretofore, a common practice used in slaughterhouses for removing ribs from livestock flanks, such as spare ribs in pork flanks, consists in manually removing the ribs portion from the belly of a flank by pulling a hand tool provided with an elongate blade or thread secured at both ends thereof to a pair of handles. Such conventional manual technique has many drawbacks. Manual removing is hazardous and time-consuming for the butchers, and provides relatively poor control on the quality of the end products, which are ribs and beacon being cut from belly. Parameters used as quality criteria generally applied to ribs are average thickness under the ribs, length of the portion tail extending from the first rib, which parameters have to be within respective predetermined ranges, and cut profile which has to generally corresponds to junction of the two main muscles located on the inner side of the flank. As to the separated belly, which should also contain a part of meat, average thickness should be within a predetermined range for optimal classification of belly for bacon production, the range depending on initial flank thickness. The average thickness of meat left under the ribs is one of the most important parameters to control during the cutting operation, which parameter has also great impact on flank classification for bacon. Even for butchers highly skilled in manual rib cutting, a belly may nevertheless be downgraded for bacon due to an insufficient remaining meat thickness thereunder. Therefore, using the foregoing criteria, removed ribs and belly have to be visually inspected and sorted according to predetermined quality grades, which further operations contribute to increase production costs.

In the past years, some butchering systems have been proposed to automate the separation of livestock carcasses in primal cuts, such as the apparatuses disclosed in U.S. Pat. No. 3,159,869 issued on Dec. 8, 1964 to Vogt et al., and in U.S. Pat. No. 4,662,029 issued on May 5, 1987 to Helsene et al. The former patent discloses a semi-automatic apparatus for breaking-up hog carcasses in pieces, including ribs and belly, wherein a light probe connected to an electromechanical controller is manually directed toward a selected one of the carcass portions by an operator to form a light scribe line on the surface thereof, thereby indicating to the controller a target position of a controlled tool as determined by the operator through visual inspection. Such apparatus still requires substantial manual operation. Although the apparatus of Vogt et al. represents an improvement over wholly manual removing technique, it still requires some manual operation. Helsene et al. disclose a prior art automated apparatus for cutting hog carcasses into primal cuts, which apparatus includes a computer vision device, an automated scribe saw to cut the ribs in a vertical plane at a predetermined depth along the back ribs and loin junction, followed by two further parallel automated cutting stations provided to respectively pull the meat part of the loin out from the back ribs and spine and remove spare ribs from belly as part of the flank. The computer vision system includes a camera located above a carrying conveyor for scanning the half carcasses following foot, ham and shoulder removing therefrom, which camera is connected to an image processing computer which locates reference points of the loin and ribs to automatically control the movement of cutting devices used to further separate the half carcass, pull the loin and remove the ribs. The ribs removing station uses a pair of elongate blade support elements projected downwardly from an upper housing secured to a frame and each being connected to one end portion of a V-shaped elongate blade. The housing contains the control elements for vertically adjusting the blade according to the predetermined cutting depth of the scribe saw, and for laterally adjusting one of the blade support relative to the other, according to control information received from the computer. Although the system proposed by Helsene et al. represents an improvement over earlier manual ribs removing technique or prior semi-automatic apparatus, since the computer stores only belly's back fat thickness information, adequate control of the thickness of the remaining meat under the ribs cannot be achieved since the vision system of Helsene et al. does not provide any information about ribs thickness for accurately controlling movement of the cutting blade in a vertical direction.

In U.S. Pat. No. 4,979,269 to Norrie, there is disclosed an apparatus for the separation of back fat from a loin portion of a pork half carcass carried by a lower conveyor under a pressure device, which apparatus uses a generally arcuate blade interposed between the conveyor and the pressure device and being movable relative to the conveyor according to thickness as measured between the visible back fat and meat portions of the loin portion at an edge thereof, using a flank edge facing camera as part of an optical sensing device. However, such measurement principle cannot be adequately applied for ribs removal since back fat thickness being not even throughout the back surface of the flank, remaining meat thickness under ribs cannot be derived from a measurement of the back fat thickness at a visible edge of the flank.

In PCT published application 91/04670 to Khodabandehloo, there is disclosed a robotized cutting apparatus for separating meat from bones, which apparatus comprises a robot having a robot arm provided with a cutting tool having a cutting blade and having a force sensor at a free end thereof, and a processing unit including a force feedback device receiving sensed force signals and having an output connected to a robot controller. Cameras are connected to a vision processing unit having a first output being coupled to a decision processing unit, and second output being coupled to a data update processor feeding a memory for storing information about previous carcasses, the decision processing unit having access to the stored data. The cameras are used with the vision processing unit to determine the spatial coordinates of a number of position on the carcass, for example the positions of a particular bone. The stored data include the coordinates of the particular positions of the carcasses, and of the cutting paths that were followed by the cutting blade to remove meat from the carcasses. If the new data correspond closely to the data relating to an earlier carcass, this relationship is used to determined the starting point of the cutting path for the new carcass. If such relationship cannot be found, a new cutting path entry point is derived. Then, the cutting blade is moved through the carcass meat according to an initial direction and angular position until the sensed reacting force acting thereon raises beyond a predetermined threshold level corresponding to a hard material such as bone, and the movement and angular position is corrected accordingly in a feedback mode of operation. The current position coordinates of the cutting blade is continuously compared to stored cutting path data corresponding to a selected previous comparable carcass, to provide further correction if required. However, since reaction force monitoring technique used by the apparatus aims at avoiding meat left under the bones, such prior art apparatus cannot be useful for ribs removing, control of the meat thickness left under ribs being an important quality requirement.

SUMMARY OF THE INVENTION

It is a feature of the present invention to provide apparatus and method for removing ribs from belly of an animal flank providing control on the thickness of meat left under the ribs.

According to the above feature, on a broad aspect of the present invention, there is provided an apparatus for removing ribs portion from belly of an animal flank. The apparatus comprises transport means for carrying the flank with flank top surface showing ribs facing outwardly from an input of the apparatus toward an output thereof, said transport means being provided with means for holding the flank in position thereon. The apparatus further comprises image sensing means for generating image electrical signals representing an image of the flank top surface, means for generating surface profile data characterizing the flank top surface and means for generating ribs thickness data for the ribs. There is provided processor means receiving the image electrical signals, the surface profile data and the ribs thickness data for deriving therefrom programmed cut data according to a predetermined meat thickness profile to be left under the ribs. The apparatus further comprises robot means provided with a cutting means and controller means for the transport means and the robot means operable to produce relative movement between the cutting means and the flank according to the programmed cut data to allow removal of the ribs portion from the belly.

According to another broad aspect of the present invention, there is provided a method for removing ribs portion from belly of an animal flank, said method comprising steps of: i) generating image electrical signals representing an image of a flank top surface showing ribs; ii) generating surface profile data characterizing the flank top surface; iii) generating ribs thickness data for the ribs; iv) deriving from the image electrical signals, the surface profile data and the ribs thickness data a programmed cut data according to a predetermined meat thickness profile to be left under the ribs; and v) cutting the flank according to the programmed cut data to allow removal of the ribs portion from the belly.

BRIEF DESCRIPTION OF THE DRAWINGS

Preferred embodiments of the present invention will be then described with reference to the accompanying drawings in which:

FIG. 5a and 5b are partial schematic view of the flank stiffness measuring device provided on the apparatus shown in FIG. 4 according to arrow B therein, showing respectively a high stiffness flank and a low stiffness flank;

FIG. 6 is a schematic view of the optical subsystem of a laser ranging unit provided on the apparatus as shown in FIG. 4;

FIG. 7 is a perspective view of a end cutting tool used in the apparatus as shown in FIG. 4, showing twin cutting blades provided thereon;

FIG. 8a is a front view of a single blade which may be provided on the end cutting tool as shown in FIG. 7;

FIG. 8b is a cross-sectional view along lines 8—8 as shown in FIG. 8a.

FIG. 9 is a side view of a flank separating station provided on the apparatus as shown in FIG. 4 according to arrow C therein;

FIG. 9a is a perspective view of the falling guide plate provided on the separating station of FIG. 9;

FIG. 10, is a schematic partial plan view of a right flank showing the programmed cut profile for removing the ribs portion from the belly of the flank;

FIG. 11 is a schematic side view of an X-ray imaging unit used in a second embodiment of the present invention;

FIGS. 16a to 16i are schematic top views of a right flank under removal operation, showing the cutting element at various cutting position along the cut profile;

DETAILED DESCRIPTION OF PREFERRED EMBODIMENTS

Figure 1:
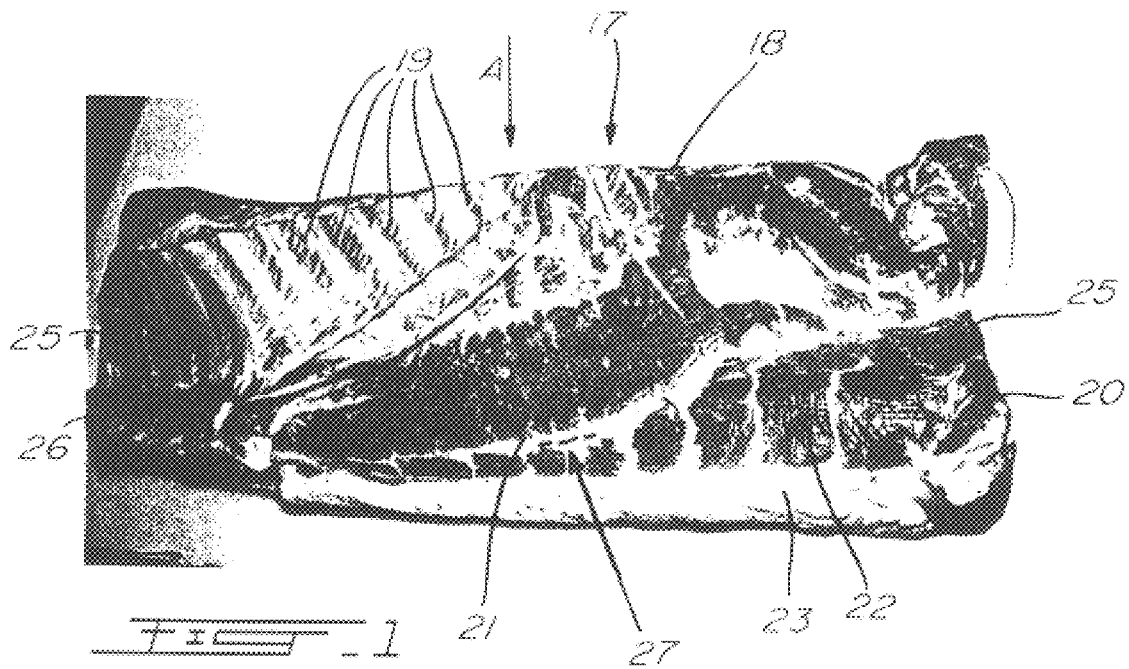
FIG. 1 is a perspective photographic view of a pre-flattened right flank prior to ribs removal, showing the ribs and the belly.
Figure 2:
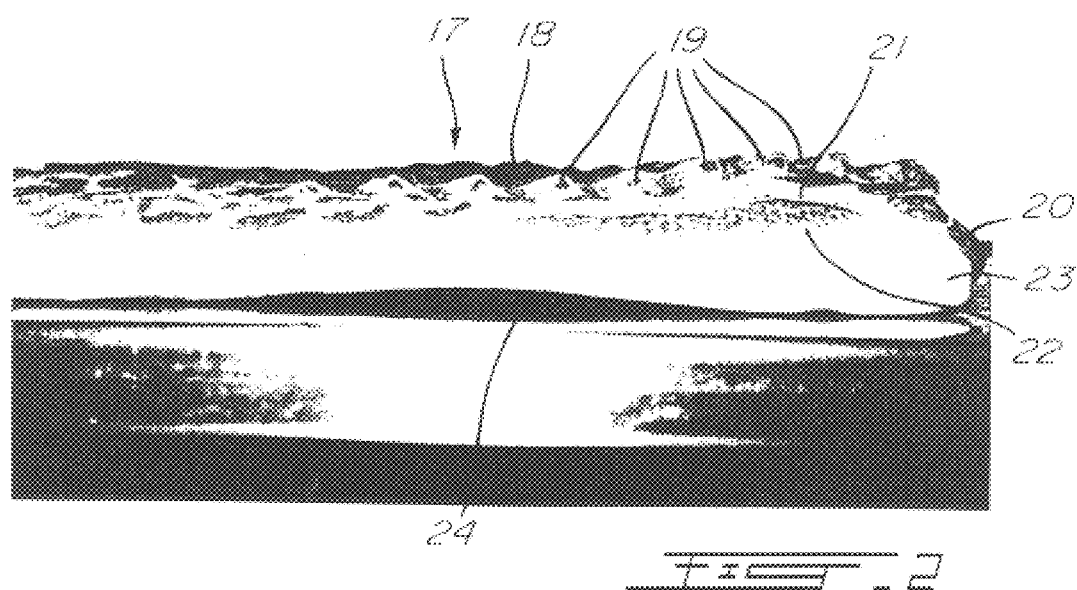
FIG. 2 is a side photographic view of the right flank shown in FIG. 1 according to arrow A therein.
Figure 3A:
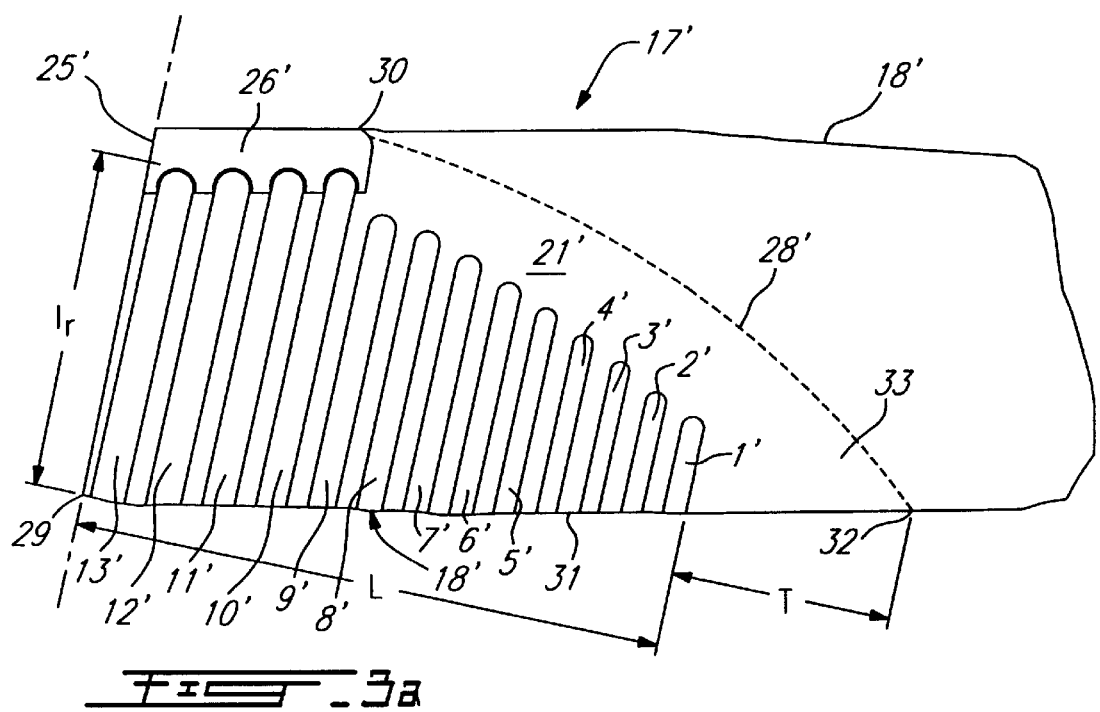
FIG. 3A is a plan view of a schematic representation of the top surface of a left flank.
Figure 3B:
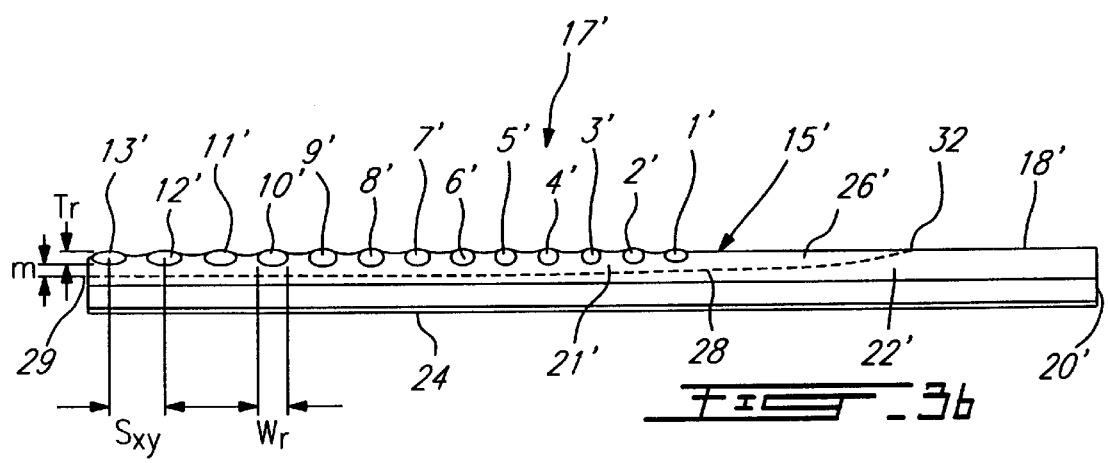
FIG. 3B is a side view of the schematic representation of the left flank shown in FIG. 3A.
Figure 3C:
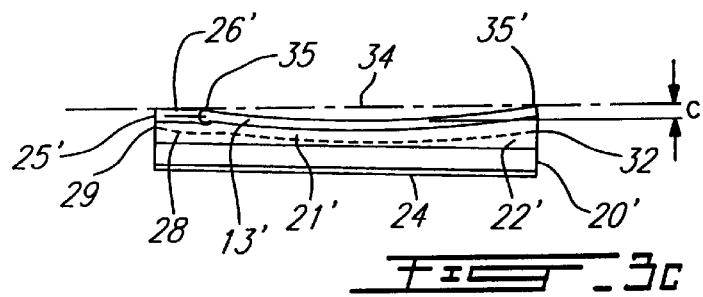
FIG. 3C is an end view of the schematic representation of the left flank shown in FIG. 3A.

Referring now to the drawings, and more particularly to FIGS. 1 and 2, there is shown photographic representations of a right pork flank as generally designated at numeral 17, which flank 17 typically comprises ribs portion 18 including a plurality of ribs 19 and adjacent lean meat area 21, and belly 20 including lean meat area 22 and back fat area 23, next to skin area 24. It is to be understood that flanks provided from other animal species can be processed according to the present invention, whenever removal of ribs from belly is desired to produce primal meat cuts having economic value. It can be seen in FIGS. 1 and 2 that the flank 17 has been previously separated from shoulder and loin/spine portions of a pork carcass by respectively transversally cutting thereof along flank edge 25, as shown in FIG. 1, and longitudinally cutting the carcass along the spine according to a cutting path passing across the ribs 19 as better shown in FIG. 2. The flank 17 as shown in FIG. 1 and 2 has been previously flattened to facilitate the following cutting operation, which will be described later in more detail. As for a typical manual removing technique, the desired cut profile extends at the surface of the top surface of the flank 17 showing ribs 19 and sternum 26 along a fatty narrow line 27 separating lean meat area 21 as part of the ribs portion 18 from lean meat area 22 as part of the belly 20, corresponding to junction of the two main muscles located on the inner side of the flank 17. Turning now to FIGS. 3a and 3b, there is illustrated a schematic representation of the ribs side surface of a left pork flank as generally designated at numeral 17', which flank 17' comprises ribs portion 18' including a plurality of ribs designated at numerals 1' to 13' from inner rib 1' toward outer rib 13', belly portion 20' and sternum portion 26'. As shown in FIGS. 3b and 3c, the lean meat area includes ribs lean meat area 21' and belly lean meat area 22'. Each rib 1' to 13'. is characterized by a corresponding average rib thickness value $t_r$ rib width $w_r$, and a corresponding rib length $l_r$, with r=1, 13, as shown in FIG. 3b. Adjacent ribs x and y, such as ribs 1' and 2', ribs 2' and 3' and so on, are distant each another in a substantially parallel spaced relationship according to a corresponding spacing value $s_{xy}$, as shown in FIG. 3b. A typical desired cut profile extends under the ribs lean meat portion 21' from an entry point 29 located at an end portion of the ribs sectioned edge 31 of the flank 17', for then emerging from the flank's surface at a intermediate point 30, to reach a withdrawal point 32 located at the end of the ribs portion tail 33, as better shown in FIG. 3a. The length T of the ribs portion tail 33 is defined by the spacing between the sectioned end of the first rib 1' and the end point 32 of the ribs portion tail 33. As can be seen from FIG. 3c, following flattening, the rib 13' and preceding adjacent ribs 1' to 12' (not shown in FIG. 3C), show inwardly curved profiles with reference to respective reference lines 34 passing through a pair of maximum height points 35 and 35' located at opposed ends of each corresponding rib's surface. The cut profile 28 substantially shows an inwardly curved profile characterized by a non-null curvature index c and corresponding to a mean cut profile for ribs 1' to 13', which cut profile 28, as shown in FIG. 3b, is inwardly shifted relative to a corresponding rib underneath surface to a value that depends on the desired meat thickness m to be left under the ribs, as later explained in more detail. As better shown in FIG. 3a in view of FIG. 1, the cut profile 28 emerges at the surface of the flank 17' in the area of the fatty line 27 to form a flank surface cutting line 28'.

Figure 4:
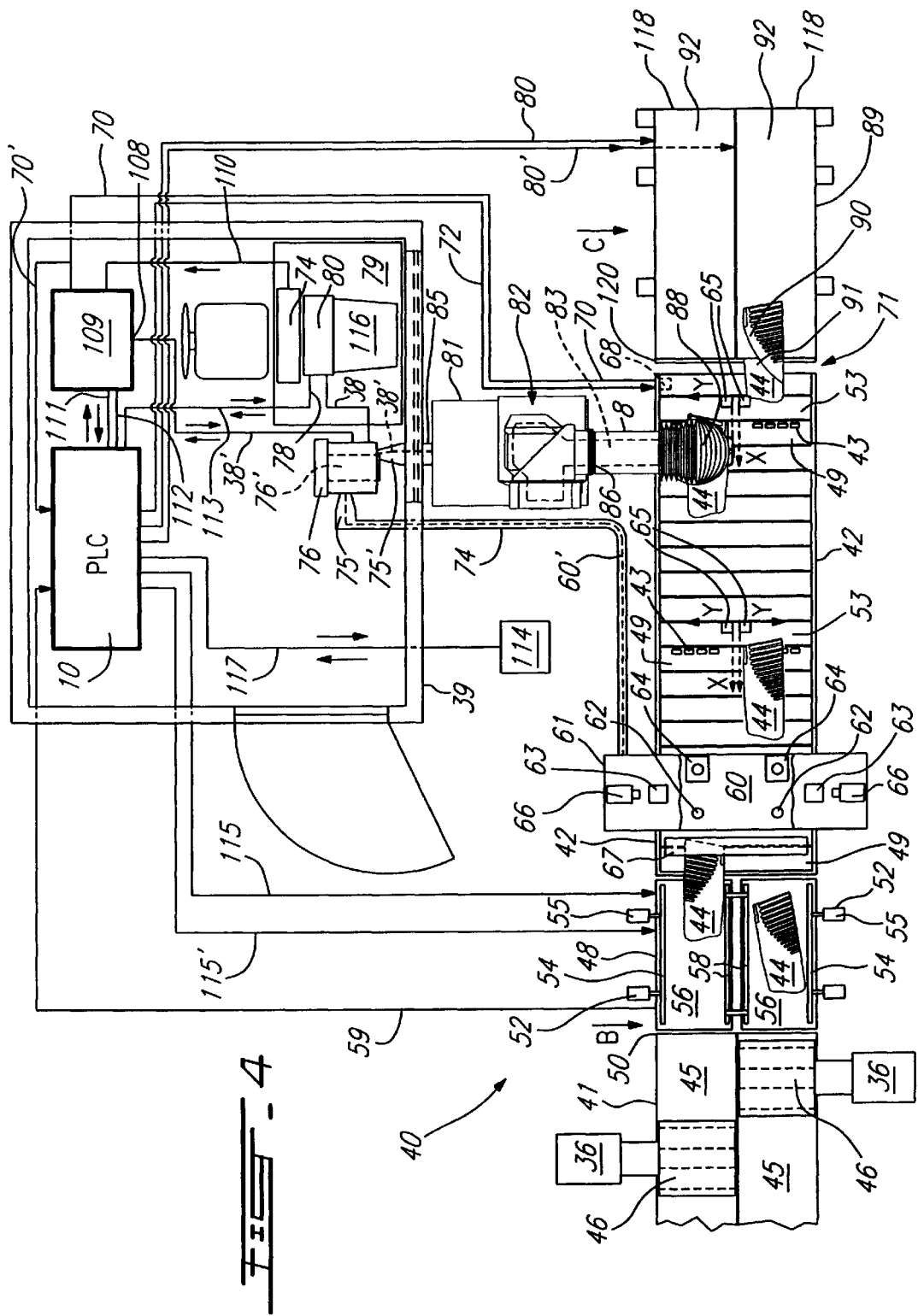
FIG. 4 is a schematic top view of a first embodiment of a rib removing apparatus according to the present invention.

Turning now to FIG. 4, a first embodiment of the apparatus according to the present invention will be described. The ribs removing apparatus as generally designated at numeral 40 comprises a transport means in the form of an aligning and synchronizing conveyor station 48 followed by a main feeding conveyor 42. The conveyor station 48 is adapted to receive flanks 44 to be processed, which may have been previously flattened using a conventional flattening station 41 provided with one or more compressing rolls units 46 driven by electric motors 36 and disposed over conveyors 45 that are of a construction well known in the slaughtering art. Although a single flank feeding conveyor mean may be used, it can be advantageously designed to allow two parallel input lines for flanks, to provide higher production rates. The aligning and synchronizing conveyor station 48 comprises a pair of orienting devices 52 each having a displaceable guide member 54 mounted on actuators 55 and longitudinally disposed above a respective outer edge of one of adjacent synchronizing conveyors 56 provided on the station 48, and a fixed inner guide member 58 longitudinally disposed over an inner edge of the corresponding one of synchronizing conveyors 56. Actuators 55 receive control signals through lines 115 and 115', as will be later explained in more detail. The conveyors 56 lay in a plane which is lower than a corresponding plane in which the conveyors 45 are laying, each being provided which a flank stiffness measuring device 47, as shown in FIGS. 5a and 5b. Each stiffness measuring device 47 comprises a pair of opposed support members 51 disposed in a parallel spaced relationship over the corresponding aligning conveyor 56, on which opposed support members 51 are innerly mounted a series of optical detector 57 each formed by a light element and a corresponding opposed light sensor coupled to output line 59 as shown in FIG. 4. As will be explained later in more detail, flank stiffness generally increases with fat content of the flank, and can be used as a cutting parameter. The conveyor 42 as shown is of a conventional transverse flexible plastic slats type, having flank gripping means in the form of a plurality of series of hooks 43 secured to spaced conveyor slats 49, which hooks 43 are preferably forwardly oriented to provide stronger gripping. Over the input end of the conveyor 42, is transversally mounted an upper roll 67 for downwardly applying pressure onto the flank top surface to cause complete penetration of the gripping hooks 43 into the underneath skin and belly. The apparatus 40 further comprises a vision station 60 mounted on a support frame (not shown) within a sealed enclosure 61 transversally extending over the main conveyor 42 with proper clearance to allow the flanks 44 to pass freely thereunder.

As will be later explained in more detail with reference to FIG. 6, the vision station 60 is used to scan the top surface of a flank prior to be cut through laser sources 62 and upper cameras 64 as part of laser ranging units for generating first image signals which will be processed to derive flank top surface profile data, and to scan sectioned ribs side surfaces illuminated by flashing light sources 63 through lateral cameras 66 for generating second image signals which will be processed to derive ribs thickness data. Conveyor slats 53 adjacent gripping conveyor slats 49 are provided with a pair of reference marks or blocks 65 located on the slats 53 to intersect respective working optical field of upper cameras 64, to provide reference to an absolute XYZ Cartesian system of coordinates (x,y,z), having its origin being fixed relative to the conveyor slats 53, utility of which system will be later explained in more detail. The enclosure 61 is provided with sealed glazed openings (not shown) disposed to properly intersect respective optical working fields of laser sources 62, flashing light sources 63 and cameras 64, 66. The enclosure 61 is tightly connected to a first end of a forced-air circulating duct 74 passing through a control room 39 and having a second end coupled to a first output 75 provided on a forced air supply means such as air blower unit 76 driven by an electric motor 76' for maintaining a positive pressure within the enclosure 61, to control air condition required for proper operation of the optical and electronic components included in the vision station 60. First and second image signals are sent through a pair of lines included in the bundle of lines 60' passing through the duct 74 and the air output 75 to leave the air blower unit through output line 38 connected to an input 78 provided on a computer 80 as part of an image processing and control station 79 further including a computer display 116 and a data input device such as keyboard 74 connected to the computer 80. Control signals for the operating laser sources 62, flashing light sources 63 and cameras 64, 66 are sent by the computer 80 through respective lines included in the bundle of lines 60'. A control signal is also generated by a position encoder 68 mounted on the main conveyor 42 to sent electrical signal through an output line 70, which signal is used to monitor conveyor speed to provide, through input line 72, control of electric motor (not shown) driving the main conveyor 42. The apparatus 40 further includes a sealed multi-axis robot 81 suitable to be operating in compliance to sanitary standards.

It is to be understood that other type of multi-axis robot than the one shown in FIG. 4, such as a gantry type robot, can be used. The robot 81 as shown in FIG. 4 is a FANUC M-710 having a robot arm 83 being covered with a custom shield 82 made of an air-tight washable waterproof material to provide sealing as required, while allowing members of the robot arm to move about their respective axis using sealed rotating joints or bellows 88 provided on corresponding sections of the shield 82. The material used must resist to corrosive substances as found in cleaning products, and its external surface must be free of cavities where bacteria could grow. Examples of such material are FDA 8128, 28 oz., food grade vinyl coated polyester as distributed by Soper, Engineered Fabric Products; LFP 2100, 100% Teflon resin as distributed by Intertex Textiles Inc., Textiles Coated International, or 2100-96/440 G/M2 polyurethane coated nylon fabric as distributed by Barrday Inc. Alternately, one can use sealed robot such as those disclosed in the following American Patents: U.S. Pat. No. 4,668,146; U.S. Pat. No. 4,732,526; U.S. Pat. No. 4,984,745 and U.S. Pat. No. 5,212,432. The shield 82 is supplied with forced-air through a conduit 85 coupled to a second air output 75' provided on the air blower unit 76, to maintain a positive pressure within the shield 82. The robot 81 is connected by a line 38' passing through the conduit 85 to reach a main input/output bus terminal 108 of a robot controller 109, which is in turn coupled to the computer 80 through a bus line 110 using a communication protocol such as RS-232, for transmitting computerized cut profile data.

The robot arm 83 is provided at a working end thereof with an end cutting tool 84 as shown in FIG. 7, which includes a mounting disc 87 rigidly secured to the robot free end for rotation about its longitudinal axis, which disc 87 rigidly holds a base portion 93 of a safety clutch 96 of a conventional construction further having a releasable main body 93' provided with a disc 93" rigidly supporting a tool holding block 97. The safety clutch 105 operates under pressurized air fed thereto through air inlet 96' receiving a flexible hose 196 passing through an aperture 187 provided on the mounting disc 87, the hose 196 being wound on an axial reel (not shown) defined at robot free end to provide free rotation thereof, and being connected to a controlled pressurized air supply (not shown). The current state of the safety clutch is being monitored in a conventional manner through the use of an optical sensor (not shown) producing an electrical signal through a line 197 passing through an outlet 96" provided on the clutch main body 93' and through aperture 187, being wound on the robot end reel to reach control means which will be described later. Whenever the cutting tool 84 runs against an obstacle, the main body 93' is caused to be released, thereby preventing or limiting damage either to the robot or obstacle. Secured to the holding block 97 through protruding abutments 98 and releasable locking device 99 is an elongate base member 95 of a blade holder 100. The locking device 99 is of a conventional lock-balls type for providing controlled release of the base member 95 when a blade change is required. The device 99 comprises a bi-directional twin-chamber pneumatic actuator located within the holding block 97 and mechanically coupled to a plunger extending through a bore 195 provided on the base member 95. The actuator of the locking device 99 is adapted to moved inwardly or outwardly under pressurized air respectively fed through flexible hoses 198 and 199 also passing through the aperture 187 and being wound on the robot end reel for connection to a controlled switching pressurized air supply (not shown). Activation of the pneumatic actuator outwardly causes release of the clamping balls from the base member for allowing tool change, while activation of the pneumatic actuator inwardly causes locking of the clamping balls onto the base member for rigidly securing the cutting tool 84 to the holding block 97, while abutments 98 prevent rotation of the cutting tool 84. Actual position of the actuator is being monitored in a conventional manner through the use of a pair of optical sensors (not shown) disposed at suitable location within the holding block 97 to send detection signals through lines 200 and 201 whenever the plunger actually reaches the selected release or lock position upon application of air pressure. Lines 200 and 201 also pass through the aperture 187 and are wound on the robot end reel for connection to a control means which will be described later.

The base member 95 is further provided at opposed ends thereof with a pair of V-shaped blade supporting members 101 and 101' having first respective ends rigidly retaining through suitable fastening means 104 opposed ends of a first elongate U-shaped cutting blade 102 and second respective ends rigidly retaining opposed ends of second U-shaped cutting blade 102'. Although having a similar general U-shaped configuration, blades 102 and 102' show different geometric configurations that are adapted to specific ribs curvature ranges. Especially for cutting soft flanks showing low stiffness, the end cutting tool 84 can be provided with a low frequency oscillating actuator (not shown) pneumatically or electrically driven, to make cutting easier for the blades due to resulting shearing effect, which blades otherwise could forwardly tear through the meat leaving some undesirable meat accumulation under the ribs. Experience has shown that using a single blade cannot be suitable for cutting batch of flanks showing wide range of ribs curvature. For example, if a blade is properly designed for flanks showing low ribs curvature, using the same blade to cut flanks characterized by high ribs curvature will generally yield to excessive meat left under ends of the ribs. Referring to FIG. 8a, the blade 102 is formed by a first curved cutting portion 106 followed by a substantially straight blade portion 107. In the example shown in FIG. 8a, the length of straight portion 107 is adapted to flanks showing relatively low curvature, and angles "a", "b" and "c" are respectively about 32°, 66° and 82°. For a flank showing relatively high curvature, a shorter straight portion 107 should be used, with angles "a", "b" and "c" being respectively about 36°, 64° and 80°. To reduce blade deformation during cutting high stiffness flanks which could alter the cutting path, a high stiffness blade showing high moment of inertia is chosen, with cutting edges angle "d" of about 18° as shown in FIG. 8b. It is important to use very sharp blades to avoid cutting problems such as undesirable blade bending, meat tearing or meat compression. Returning to FIG. 4, a the output end of the apparatus, there is provided a flank separation station 89 used to completely separate the ribs portion 90 from the belly 91 after cutting operation. The flank separation station 89 essentially comprises a pair of upper adjacent conveyors 92 for receiving ribs portion 90 of a cut flank 44, and a pair of lower conveyors 94 for receiving belly 91 of a cut flank 44, as better shown in FIG. 9. The upper conveyors 92 are pivotally mounted at outer ends 118 thereof on the frame 77 and are normally supported by abutments 119 secured to the frame 77. Next to the outer end of the conveyors 94 is a pair of output conveyors 94' to bring the cut belly out of the apparatus. The lower conveyors 94 are pivotally mounted at their respective inner ends 120 thereof on the frame 77 and are supported by abutments 121 secured to the frame 77 when conveyors 94 are at their lower position. The station 89 further comprises a falling guide plate 37 having a plurality of slots 69 at an upper edge thereof and a downwardly extending comb portion formed by a series of elongated inwardly curved fingers 37', as better shown in FIG. 9a. The belly 91 of a cut flank 44 leaving the output end 71 of the main conveyor 42 reaches the upper edge of the guide plate 37 by gravity and upon downwardly pulling force applied by the hooks 43. The slots 69 allows the hooks to pass through the guiding plate while being withdrawn from the underneath surface of the belly 91. Operation control of the flank separation station 89 is carried out according to control signals received from input lines 80 and 80', as shown in FIG. 4.

As also shown in FIG. 4, the apparatus 40 further comprises a programmable logic controller (PLC) 105 used to send basic control signals to the moving elements of the apparatus, which PLC 105 communicates through RS-485 protocol with a dedicated operator programming interface 114 for use by an operator standing near the vision station 60. The PLC 105 receives input signals coming from optical sensors 57 as shown in FIGS. 5a and 5b through line 59 and from rotary encoder 68 trough line 70. The PLC 105 also exchange through main input/output parallel communication line 111, information signals with the robot controller 109 regarding respective current operation state and current working cycle among available working cycles that may include cutting, exposed components washing, blade sanitation, cutting tool changing, etc. For performing exposed components washing, a cleaning fluid nozzle (not shown) connected to a proper cleaning fluid supply, can be mounted on the tool holder, which nozzle can be displaced around exposed components of the apparatus according to a predetermined program run by the PLC 105 and the robot controller 109 while projecting cleaning fluid. Preferably after each cut, the PLC proceed with blade sanitation operation, by causing the working blade to traverse a jet of sanitation fluid such as hot water produced by nozzles (not shown) connected to proper fluid supply (not shown). The PLC 105 can be also programmed to perform cutting tool changes after a predetermined number of cuts for the blade, to avoid using a worn blade. To minimize cutting tool change frequency, sharpening maintenance can be performed after a predetermined number of cuts, using a blade sharpening device (not shown) located near the main conveyor 42 and within the working range of the robot arm 83, which device may comprise a conventional sharpening rod mounted on a frame by suitable springs to provide proper compliance with the cutting tool while the robot arm is caused to rub the working blade against the sharpening rod. The PLC 105 also exchanges with the robot controller 109 information signals for providing variable operation speed through control line 112. The PCL 105 is connected to computer 80 through bus line 113 using two-way communication protocol such as RS-232, for receiving information signals on current status of the vision system and to send to the computer current status and cut parameter information signal such as flank presence detection, flank stiffness measurement, flank right/left carcass side identification, etc. The PLC in turn sends through lines 115 and 115' output signals to control actuators 55 and respective speed of conveyors 56 of the aligning and synchronizing station 48, to provide accurate synchronization with an emerging slat 49 to ensure that hooks 43 penetrate within a leading edge portion of an incoming flank 44. The PLC 105 also sends through line 72 an output signal to control the speed of the main conveyor 42. Finally, the PLC respectively sends through lines 80 and 80' control signals to adjacent separating units of the flank separating station 89.

Turning now to FIG. 6, optical components of a conventional laser ranging unit such as those shown in FIG. 4 are schematically illustrated, which components include a laser source 62 generating a transverse laser beam 122 onto upper surface of a flank 44 for forming a profile trace 122' thereon. It can be seen from FIG. 4 that forward driving of the main conveyor 42 relative to the vision station 60 creates a relative movement between the flank 44 moving in the direction of arrow D and the laser ranging unit for flank scanning purposes. The upper camera 64, which is a fast framing CCD camera currently available on the marketplace, is disposed over the flank surface at a distance $Z_p$ from the surface of the conveyor 42, in a such manner that the central axis 123' of its field of vision 123 intersects top surface of the flank substantially in the vicinity of the profile trace 122'. A laser control/power unit 124 is connected through a power line 125 to the laser source 62 for energizing thereof according to corresponding control signals coming from the computer through line 124' included in the bundle 60'. The first image signals as produced by upper camera 64 is sent to the computer 80 shown in FIG. 4 though a line 129 as also part of the bundle 60', which computer 80 derives flank top surface profile data consisting for each flank 44 of a matrix of coordinates values for (x,y,z) in the XYZ system as designated at numeral 131 in FIG. 6, with value of z being obtained through conventional ranging using optical triangulation technique. As well known in the art, ranging through triangulation calculation is essentially based on the principle that there is a direct relationship between (a) the distance separating a reference plane, such as the optical plane of the camera 64 shown in FIG. 6, and a given point of the surface as measured along the axis 123' that extends in a direction perpendicular to the flank surface, and (b) the shift associated to the reflected light beam 62' as seen by the pixels of the camera 64 relative to a reference position corresponding to a reference distance. Various optical ranging methods can be used according to the present invention, as those summarized in <<Active optical range imaging sensors>>by Paul J. Besl, Machine Vision and Applications, pp. 127–152. Therefore, following proper calibration, values of coordinates z associated with each pair or coordinates (x,y) can be derived from first image signals whose corresponding pixels indicate light beam shifts values. Furthermore, first image signals represent luminance values for all coordinates (x,y) of the top surface of the flank 44. Hence, main coordinates of the desired cut profile 28, as shown in FIGS. 3b and 3c, with reference to the Cartesian coordinates system XYZ 131 as shown in FIG. 6 and FIG. 10, can be determined with the following relation:

$$zc_a = z_p - zl_a - t_a - m$$

wherein:

$z_p$ is the z coordinate value of reference plane of the upper camera 64;

$zl_a$ is the z coordinate value as part of the flank top surface profile data corresponding to the lowest surface point ($xl_a$, $yl_a$,$zl_a$) of a flank area, with a=1,A;

$t_a$ is a mean rib thickness value for a flank area h a=1,A;

m is a desired meat thickness to be left under the ribs;

$zc_a$ is the z coordinate value corresponding to a point of the cut profile having coordinates $(xl_r, yl_r, zc_a)$.

It can be seen from FIG. 10, that transverse flank areas 132 and 132' has been defined to constitute a sample from which parameters of the cut profile can be derived. In the example shown, the total number A of flank areas 132 and 132' has been chosen to nine (9), including four (4) areas 132 passing through the sternum portion 26' of the flank 44 and five (5) areas passing through the remaining portion 133 of the flank 44. The mean rib thickness $t_3$ for a given area a can be calculated by the computer 80 from the respective thickness of specific ribs found in flank area a. For example, for the first area 133 corresponding to a=1, the mean thickness $t_1$ is obtained by averaging respective thickness measured for ribs 13' and 12'. Alternately, the computer can directly use the thickness of the rib having a greater portion being intersected by the concerned area, such as rib 12' found in the area corresponding to a=1. Hence, to each flank area a, with a=1,A, corresponds a specific one of flank surface emerging points 137 and 137' having coordinates $(xe_a, ye_a, ze_a)$ that are employed to derive through interpolation the flank surface cutting line 28' as part of the programmed cut profile 28 shown in FIG. 6. It can be seen from FIG. 10 that since no rib is found in flank areas 135 and 136 respectively corresponding to a=8 and a=9, the cut profile is linearly derived using nearest prior computed value for $t_a$, which is $t_8$ in the example shown in FIG. 10 corresponding to area intersecting ribs 2' and 3', until the withdrawal point 32 is being reached.

Returning to FIG. 6, the light source 63, which is a conventional high intensity flashing light, is disposed in oblique orientation in a such manner that the generated illuminating beam 63' intersects successive portions of the corresponding facing sectioned ribs side surface, to provide complete scanning thereof. The light source 63 is connected to a light source control/power unit 126 connected through a power line 127 for energizing thereof according to corresponding control signals coming from the computer through line 127' also included in the bundle 60'. Control signals required for framing synchronization of the camera 64 are sent by the computer 80 through line 130. Lateral cameras 66 are connected to the computer 80 through lines 129' and 130' to respectively send second image signals to the computer 80 and receive control signals therefrom.

Turning now to FIG. 11, a second embodiment of the present invention uses an X-ray imaging unit as generally designated at numeral 139, in instead of the lateral cameras 66 and light sources 63 employed in the embodiment shown in FIG. 4. The X-ray unit 139 comprises a conventional X-ray generator 140 mounted over a space 142 defined between a pair of longitudinally aligned main conveyors 42' and 42" through suitable support means (not shown) and connected through a power line 145 to a control/high voltage supply unit 143 which is in turn controlled by the computer through line 145'. The X-ray generator 140 has an output gun 141 being directed to an exposed surface 142 of a flank passing over the space 142 in the direction of arrow D upon movement of the main conveyors 42' and 42" being driven in the direction of arrows E. The X-ray unit 139 further comprises a conventional X-ray linear detector array 144 transversally mounted within the space 142 and centrally aligned with the X-ray generator gun 141 to receive X-ray transmitted through the scanned flank transverse portion 142 irradiated by incoming X-ray. X-ray imaging signals generated at detector 144 are sent through output line 146 to the computer for further processing, as will be explained later in more detail. In another alternate embodiment (not shown), thickness and/or width can be measured using a mechanical probe provided with a matrix of protruding needles disposed very close to one another and movably mounted to a displaceable support base, for adapting the end profile of each rib to form an imprint thereof. Cameras can be used to guide displacement of the support base from a given rib to a next rib and to perform dimensional measurement of the imprint, with resetting the needles in their initial extended position between measurements.

Figure 12:
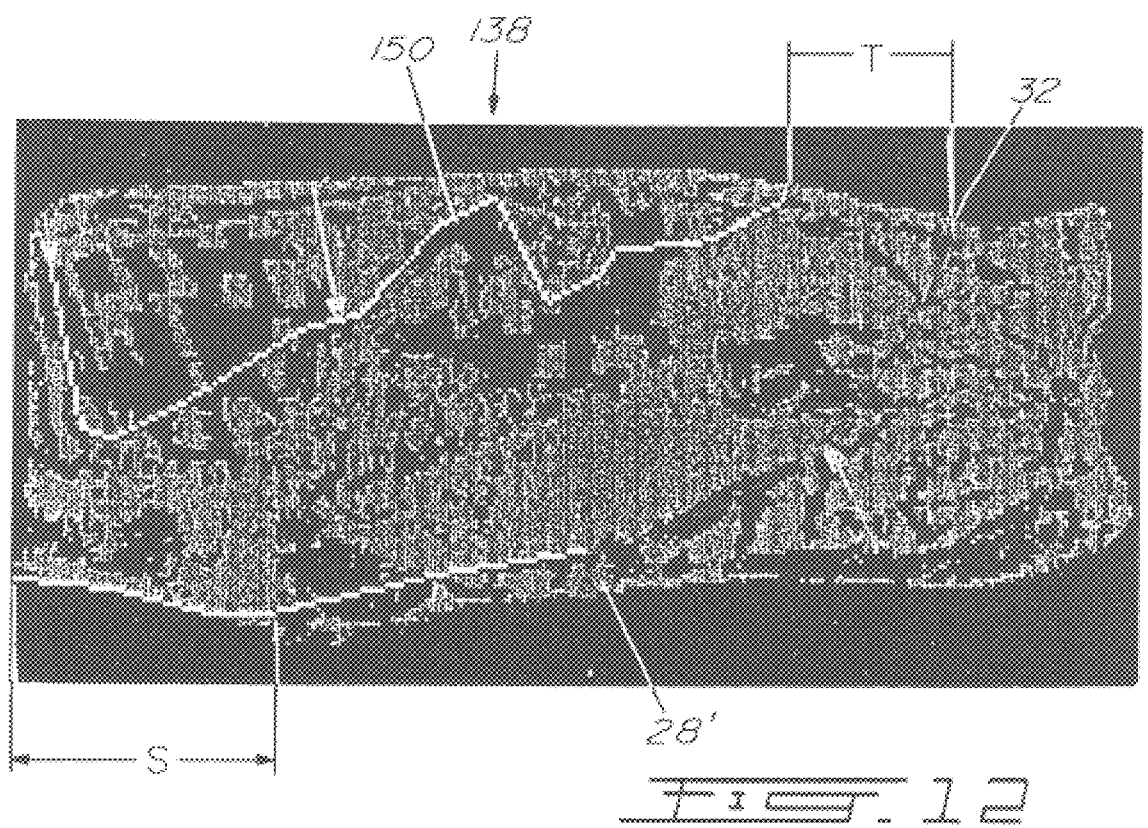
FIG. 12 is a computer processed image of the top surface of a right flank showing ribs.

Operation of preferred embodiments of the present invention will be now explained in detail, beginning with FIG. 4. Flanks 44 to be processed, which have been previously flattened at flattening station 41 are fed to the flank aligning and synchronizing station 48 provided with the flank stiffness measuring device 47, as shown in FIGS. 5a and 5b. It can be seen from FIG. 5a that the flank 44 shown, which presents high stiffness due to high percentage of fat, only obstructs the two innermost optical sensors 57 past the gap 147, while the flank 44 shown in FIG. 5b, which presents low stiffness, obstructs almost all of optical sensors 57. According to a predetermined scale of stiffness values corresponding to the various numbers of optical switches being obstructed, the PLC 105 is caused to associate a stiffness value to each flank 44, which will be used as a cutting parameter as will be explained later in more detail. The signal coming from the innermost optical sensors 57 also indicates to the PLC presence of an incoming flank to be processed. The PLC then sends a control signal either through line 115 or 115' to the concerned actuator 55 to displace the corresponding guide member 54 for laterally pushing the flank 44 toward the corresponding fixed inner guide member 58. After having properly oriented the flank 44 according to a direction substantially parallel to the longitudinal axis of the main conveyor 42, the PLC 105 causes the conveyor 56 to feed the flank to the conveyor 42 in synchronization with next leading hooks 43 bearing slat 49, while the flank 44 is being pressed between upper roll 67 and slat 49, thereby causing the gripping hooks 43 provided on the conveyor slat 49 to penetrate skin and belly under the flank 44. Then, the flank is conveyed through the vision station 60 that scans top surface of the flank 44 to generate first image signals that will be processed by the computer 80 to derive flank top surface profile data. Turning now to FIG. 12, there is generally illustrated at numeral 138 a computer-processed image of the ribs top surface of a right flank as derived by the computer 80 from the first image signals coming from the vision station. As earlier explained with reference to FIG. 6, the computer 80 also derives from the first image signals corresponding surface profile data according to the z axis. The computer analyses complete image data to derive cut parameters such as sternum length S, cut profile 28' based on localization of the two main muscles located on the inner side of the flank as explained before and lowest points forming a line 150, ribs curvature, complete position coordinates of the point of blade entry and complete position coordinates of the point of blade withdrawal. The computer 80 also receives from the PLC 105 through line 113 data representing meat thickness to leave under the ribs and tail length T as selected by an operator at interface unit 114. The computer further receives from the PLC 105 through line 113 measured stiffness signal, and right/left carcass flank carcass side indicative signal. The computer 80 generates rib thickness data used to derive the programmed cut profile data, represented by series of corresponding coordinates values for (x,y,z) in the XYZ system having its origin being fixed relative to the conveyor slates 53, as described before, from the second image signal and/or from predetermined statistical data stored in the computer memory, and from status and cut parameter information signals sent by the PLC 105, as explained before. As will be later explained with reference to FIGS. 14 and 15, since only some of the ribs are distinctly visible at the sectioned edge of the flank, technique other than direct optical measurement is required for estimating the thickness of remaining ribs. Experience has shown that a statistical correlation can be found between thickness of a given rib and thickness of the other ribs, and between width and thickness of the ribs. It has been discovered that accuracy of ribs thickness estimation for a given rib is generally better when based on width measurements for a plurality of adjacent ribs. Following TABLE 1 presents average ribs thickness and width measured values based on a sample comprising 117 flanks that were previously manually measured with a vernier.

TABLE 1

| Rib No. | Thickness $t_r$ (in.) | | Width $w_r$ (in.) | |
|---|---|---|---|---|
| | Average | Standard deviation | Average | Standard deviation |
| 1' | 0.268 | 0.055 | 0,474 | 0,067 |
| 2' | 0.285 | 0.042 | 0,490 | 0,054 |
| 3' | 0.355 | 0.049 | 0,459 | 0,057 |
| 4' | 0.387 | 0.040 | 0,454 | 0,058 |
| 5' | 0.388 | 0.043 | 0,488 | 0,060 |
| 6' | 0.395 | 0.043 | 0,511 | 0,066 |
| 7' | 0.398 | 0.040 | 0,542 | 0,066 |
| 8' | 0.414 | 0.041 | 0,570 | 0,061 |
| 9' | 0.437 | 0.043 | 0,583 | 0,062 |
| 10' | 0.430 | 0.046 | 0,624 | 0,074 |
| 11' | 0.396 | 0.052 | 0,681 | 0,080 |
| 12' | 0.357 | 0.058 | 0,733 | 0,099 |
| 13' | 0.317 | 0.058 | 0,769 | 0,107 |

In TABLE 1, $t_r$ represents the estimated thickness value for rib r, with r=1',13', while $w_r$ represents the measured width value for rib r, with r=1',13'. From data found in TABLE 1, correlation factors between all pairs of thickness and width 10 measured values are derived applying well-known statistical techniques, to develop empirical relations for obtaining thickness estimation from width measured values. Examples of such empirical relations are defined as follows:

$t_{1'} = 1.101887 - 0.09799 * w_{6'} + 0.004727 * w_{7'} - 0.015176 * w_{8'} + 0.202999 * w_{9'} + 0.166318 * w_{10'}$ $t_{2'} = 0.19346 + 0.027943 * w_{6'} - 0.053135 * w_{7'} - 0.006095 * w_{8'} + 0.331529 * w_{9'} - 0.130511 * w_{10'}$ $t_{3'} = 0.200708 - 0.121887 * w_{6'} - 0.095257 * w_{7'} + 0.050155 * w_{8'} + 0.269997 * w_{9'} + 0.131835 * w_{10'}$ $t_{4'} = 0.266155 - 0.068141 * w_{6'} - 0.088864 * w_{7'} + 0.09449 * w_{8'} + 0.273651 * w_{9'} - 0.015973 * w_{10'}$ $t_{5'} = 0.274308 - 0.080898 * w_{6'} - 0.039468 * w_{7'} + 0.108867 * w_{8'} + 0.322753 * w_{9'} - 0.117529 * w_{10'}$ $t_{6'} = 0.298599 - 0.057936 * w_{6'} - 0.038242 * w_{7'} + 0.070938 * w_{8'} + 0.350035 * w_{9'} - 0.157109 * w_{10'}$ $t_{7'} = 0.288572 + 0.08768 * w_{6'} - 0.034891 * w_{7'} - 0.020844 * w_{8'} + 0.254479 * w_{9'} - 0.084371 * w_{10'}$ $t_{8'} = 0.27193 + 0.277847 * w_{6'} - 0.65693 * w_{7'} - 0.050082 * w_{8'} + 0.125699 * w_{9'} - 0.01417 * w_{10'}$ $t_{9'} = 0.298288 + 0.195759 * w_{6'} - 0.020759 * w_{7'} + 0.154792 * w_{8'} - 0.036021 * w_{9'} - 0.026668 * w_{10'}$ $t_{10'} = 0.352137 + 0.162247 * w_{6'} - 0.023454 * w_{7'} + 0.077576 * w_{8'} + 0.216607 * w_{9'} - 0.259542 * w_{10'}$ $t_{11'} = 0.350572 + 0.262843 * w_{6'} - 0.066566 * w_{7'} + 0.049499 * w_{8'} + 0.28816 * w_{9'} - 0.398523 * w_{10'}$ $t_{12'} = 0.299605 + 0.218319 * w_{6'} - 0.070058 * w_{7'} - 0.141253 * w_{8'} + 0.5274 * w_{9'} - 0.387674 * w_{10'}$ $t_{13'} = 0.151241 + 0.288574 * w_{6'} + 0.14626 * w_{7'} - 0.464569 * w_{8'} + 0.724445 * w_{9'} - 0.363755 * w_{10'}$

Whenever any width measurement value required to evaluate the thickness of a given rib is not available or appears unreliable, or the resulting estimated thickness value appears unreliable, width or thickness associated with that rib can be given a predetermined average width $w_r$ or thickness $t_r$ values for that rib, such as those found in TABLE 1. Reliability of measured width or estimated thickness for a given rib can be verified from data found in TABLE 1, through comparison with a corresponding thickness range defined by ± two standard deviation. Whenever a measured or estimated value fall outside the corresponding predetermined range, the corresponding predetermined average value is being used. Although average values could be used directly without prior width measurements, observed statistical deviation for innermost and outermost ribs indicates that accurate cut profile is more likely to be obtained using correlation technique.

Figure 13:
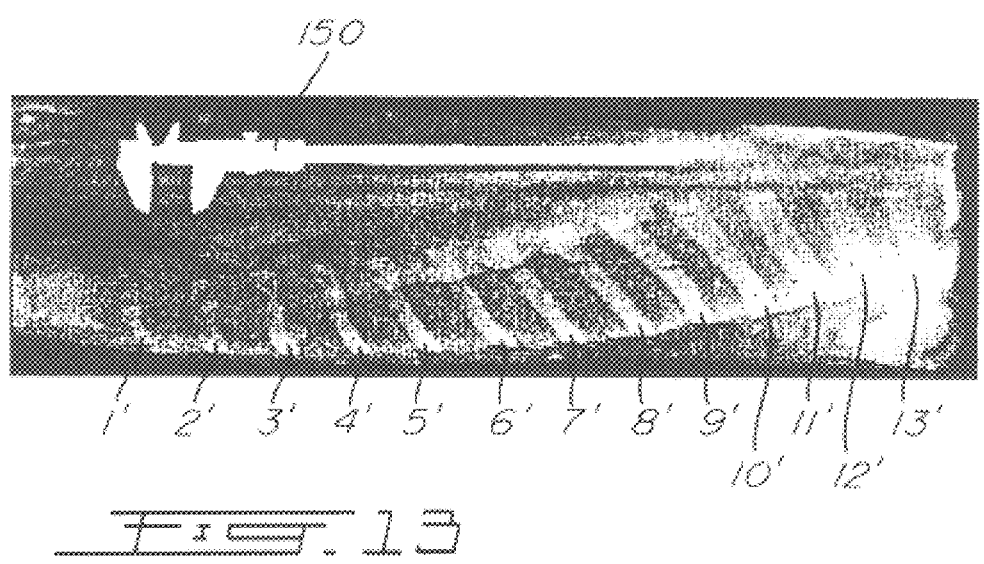
FIG. 13 is a X-ray computer processed image of the top surface of a right flank showing ribs and a reference vernier.
Figure 14:
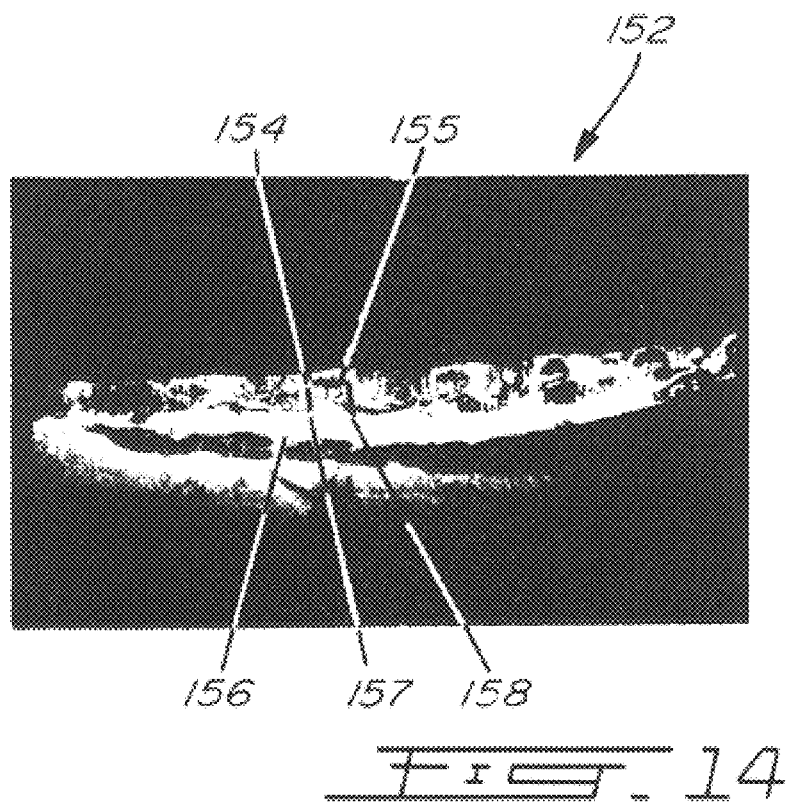
FIG. 14 is a computer processed image of the side of a right flank, showing the sectioned ribs surface.
Figure 15:
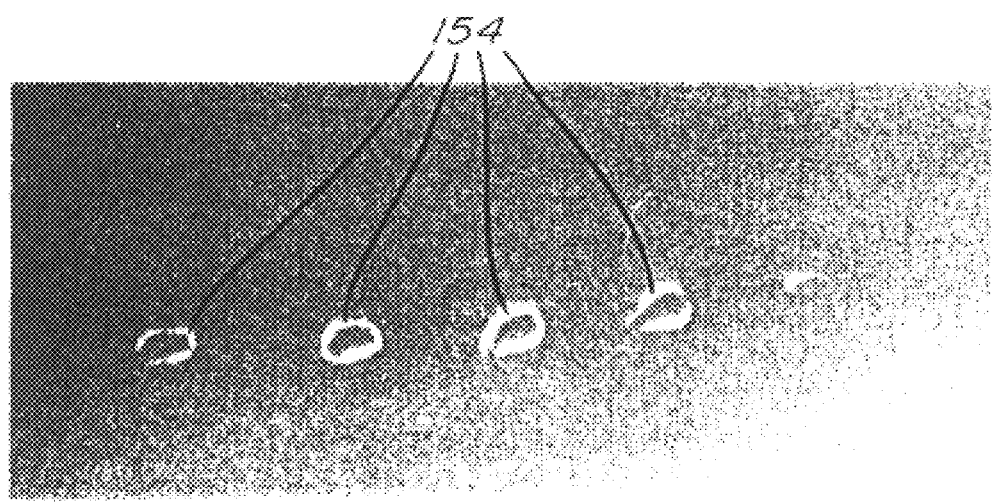
FIG. 15 is a computer processed image obtained through fluorescence of the side of a right flank, showing the sectioned ribs shell contour.

Turning now to FIG. 14, there is illustrated generally at numeral 152 a computer processed image of the side view of a right flank as obtained from the computer 80 from second image signals coming from the vision station 60. It can be seen from FIG. 14 that only some of the sectioned ribs are sufficiently distinctive to allow width or thickness measurements. Moreover, color shade of the bone shell 154 surrounding the marrow 155 of each distinctive rib being very close to color shade of surrounding fat 156, direct width or thickness measurements of the distinctive ribs may be difficult to perform even after proper image processing. An approach to obviate that limitation consists of measuring first width or thickness of the marrow of a given distinctive rib which marrow shows contrasting color shade compared to adjacent fat, and then adding a corresponding one of pairs of rib shell thickness values previously stored in the computer memory, which values were obtained through a series of width or thickness manual measurements using a reference vernier applied on each rib 1' to 13' of flanks constituting a representative sample. However, experience has shown that since marrow color shade varies from dark red to off white, a color shade merging with surrounding rib shell or fat could occur in the latter case, requiring more complex image processing and analysis to obtain reliable measurements. Another approach consists in applying known fluorescence imaging technique to provide better contrast between ribs shell and surrounding marrow, meat and fat, such a technique being disclosed in U.S. Pat. No. 4,631,413 issued on Dec. 23, 1986 to Jensen et al. The sectioned ribs flank side is illuminated with a light characterized by an excitation spectral bandwidth being centered at a first wavelength, and the reflected light captured by a camera is spectrally analyzed by a conventional spectro-fluorometer to measure intensities in the vicinity of a second wavelength comprised in the reflected spectrum and selected to maximize image contrast. Through experiments, it has been found that optimum excitation is provided at a wavelength of about 335 nm±20 nm and maximum contrast is obtained at about 410 nm. From the computer processed image of the front view of a right flank as generally designated at numeral 160 in FIG. 15, it can be seen that the sectioned ribs shell bright contours can be readily distinguished from the surrounding dark material. An alternate approach for rib thickness measurement consists in causing the computer through image analysis to find position coordinates of junction area between adjacent muscles 157 and 158 lying underneath each rib over a fat portion showing contrasting shade, which area corresponds to the lowermost edge of the rib. Having determined the position coordinates of the corresponding ribs surface from the top surface profile data, the computer derives the rib thickness by subtracting coordinates according to Z axis, and then by adding a corresponding one the pairs of rib shell thickness values previously stored in the computer memory. Another approach to obtain width or thickness measurements consists in causing the computer through image analysis to find position coordinates of the centroid of the marrow 155 for a given distinctive rib, and then adding half of a corresponding predetermined average thickness value $t_r$ for that rib, such as found in TABLE 1. In a particular case where the apparatus is provided with an X-ray unit as shown in FIG. 11, thickness of all ribs 1' to 13' are estimated from direct measurement of respective width thereof observed on the processed x-ray image, as illustrated in FIG. 13, following proper calibration using a vernier 150. As well known in the art or X-ray meat inspection, signal strength of radiation transmitted through bone of the ribs is weaker than signal strength of radiation traversing fat or meat portion of the flank. Corresponding ribs thickness values are then estimated by the computer 80 through image analysis and correlation techniques as explained before. The computer 80 sends through line 110 to the robot controller 109 cut profile data as explained before with reference to FIG. 4.

Figure 16E:
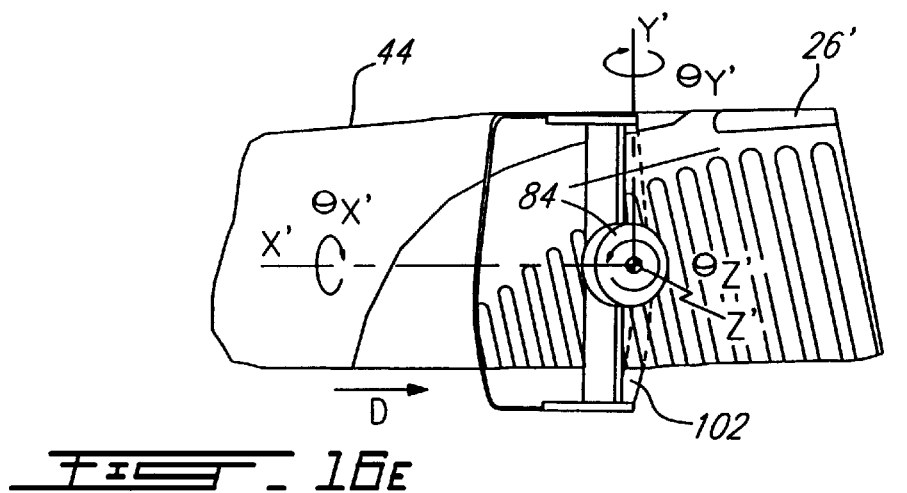
Figure 16F:
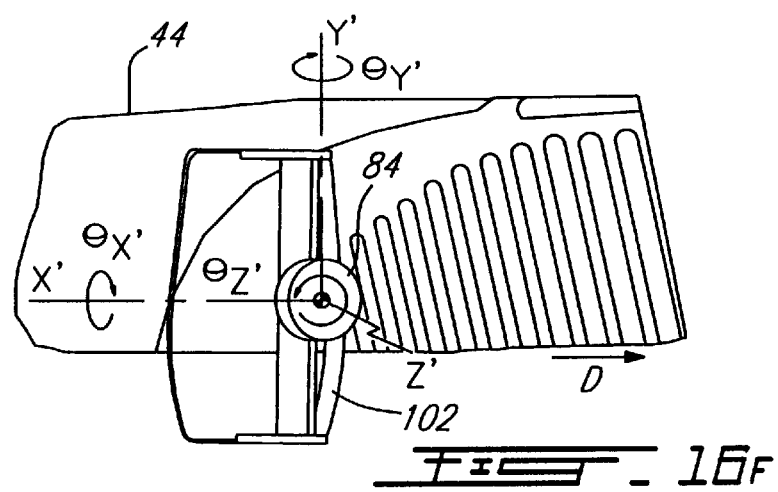
Figure 16G:
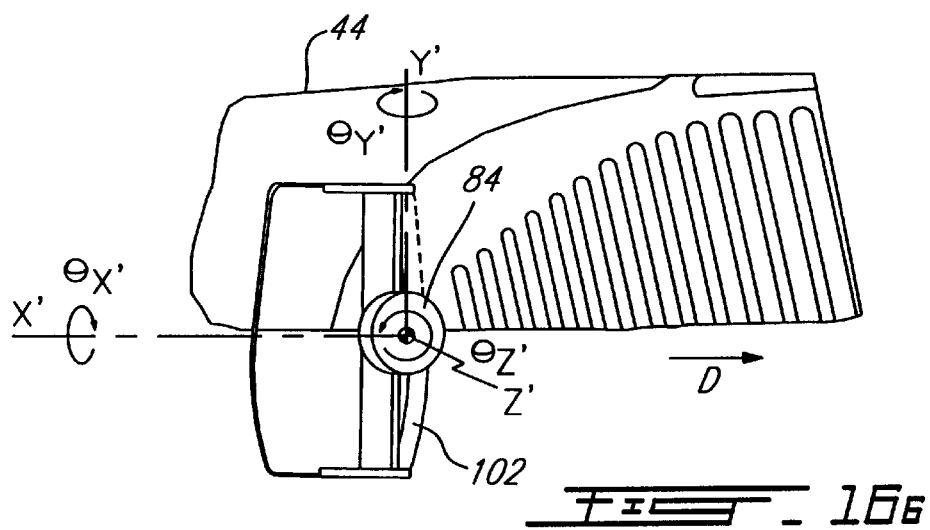
Figure 16H:
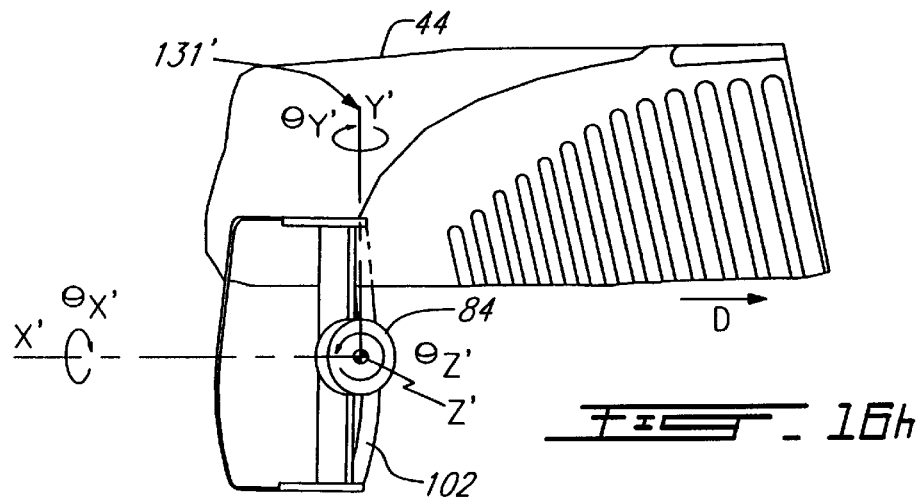
Figure 16I:
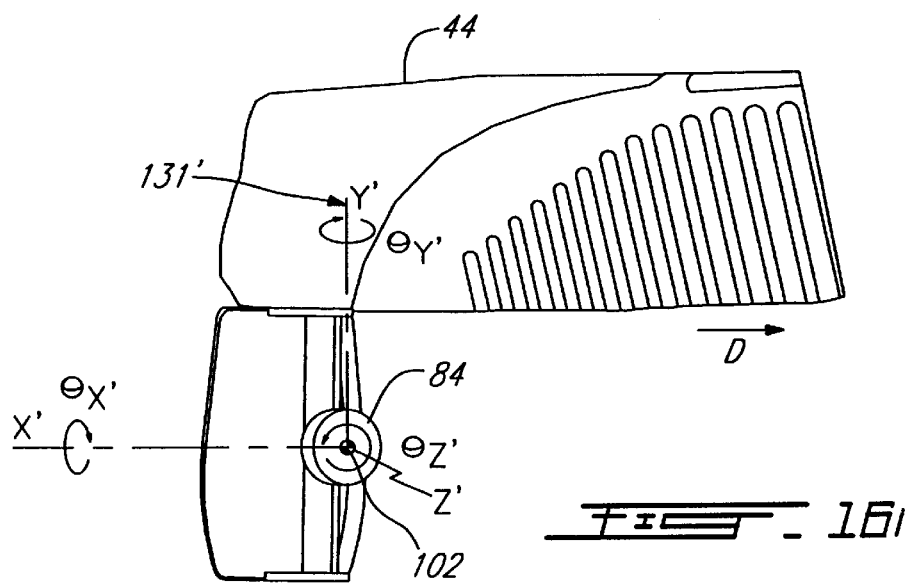
Figure 17:
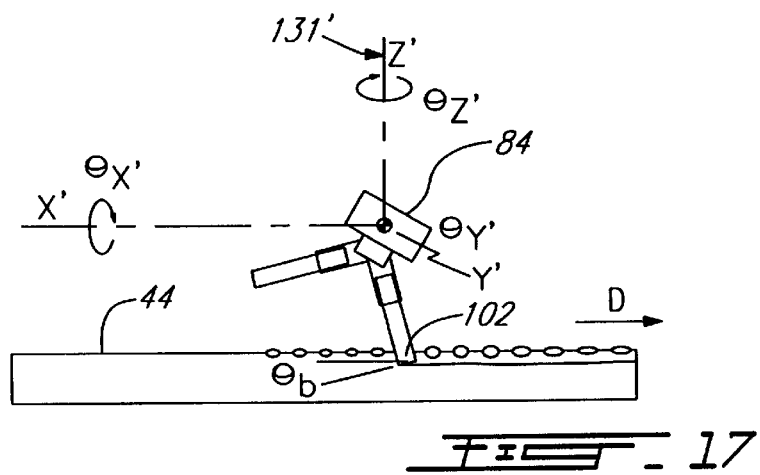
FIG. 17 is a schematic side view of the right flank shown in FIG. 16e, showing the attack angle defined by the cutting blade provided on the end cutting tool.

Turning now to FIGS. 16a to 16i and FIG. 17, cutting operation of the robot end cutting tool 84 will be now explained. At a first step illustrated in FIG. 16a, the end cutting tool 84 mounted at the end of the robot arm is caused to be displaced by the robot controller according the programmed cut profile data, to position the selected blade 102 at the programmed point of entry 29 into the flank 44, which is located at the end portion of the ribs sectioned edge 31 of the flank 44. It is to be understood that other positions for the point of entry can be selected, such as at opposed sternum outer end 154, provided the programmed cut profile is adapted accordingly. To the end cutting tool 84 is associated the origin of a secondary Cartesian coordinates system 131' including X', Y' and Z' axis, which system 131' translates with cutting tool 84 while keeping X', Y' and Z' axis respectively parallel to corresponding X, Y and Z axis of the reference coordinates system 131 shown in FIG. 6. In the example shown, the end cutting tool 84 is caused to rotate about Y' and Z' axis respectively according to the following ranges: θhd y'=0°,−78°; $\theta_{z'}$=0°,−50°, with no rotation about X' axis ($\theta_{x'}$=0). At entry point 29, the initial position of the end cutting tool 84 as shown in FIG. 16a is characterized by: ($\theta_{x'},\theta_{y'},\theta_{z'}$)=(0°,−78°,−50°). While the flank 44 is being displaced by the main conveyor in the direction indicated by arrow D, at maximum speed of about 12 in/sec, the end cutting tool 84 is caused to be inwardly displaced in the XY plane of the reference coordinates system with reference to the flank 44 according to a substantially linear path, while being displaced along Z axis of the reference coordinates system according to the programmed cutting profile data, to reach the cut position shown in FIG. 16b. Then, speed of the inwardly relative movement of the end cutting tool 84 with reference to the flank 44 is caused to be reduced to a substantially null value, by controlling speed of the end cutting tool accordingly, while the latter is being rotated about an angle of about 37° in a counter-clockwise direction to complete release of the outer rib 13' while releasing the sternum 26', for reaching the position shown in FIG. 16c, wherein: ($\theta_{x'},\theta_{y'},\theta_{z'}$)=(0°,−78°,−13°). Then, the end cutting tool 84 is caused to be displaced with reference to the moving flank 44 in a direction parallel to the X axis to further release the sternum 26', with initially rotating the cutting tool 84 about Z' axis until: ($\theta_{x'},\theta_{y'},\theta_{z'}$)=(0°,−78°,−2°), as shown in FIG. 16d. Then, as shown in FIGS. 16e and 17, having completely released the sternum 26' and without further rotation, the end cutting tool 84 is outwardly translated in the XY plane of the reference coordinates system with reference to the flank 44, while being displaced along Z axis of the reference coordinates system according to the programmed cutting profile data, to successively reach the cut positions as shown in FIGS. 16f, 16g and 16h, to finally complete the cutting operation as shown in FIG. 16i, where the blade 102 of the end cutting tool 84 is completely withdrawn from the flank 44. It can be seen from FIG. 17, that the cutting edge plane of the blade 102 shows a negative attack angle $\theta_b$ with reference to an horizontal axis parallel to X axis, to prevent premature upward withdrawal of the blade 102 caused by an upward bending deformation of the blade 102. Experience has shown that using an attack angle $\theta_b$ of about 12°–15° essentially prevent premature upward blade withdrawal for flanks showing low stiffness, provided the proper blade is selected according to the measured ribs curvature, as explained before. It has been found that when the attack angle $\theta_b$ is set at a value substantially higher than 15°, downward blade deformation occurs, leaving excessive meat under the ribs. For flanks showing high stiffness value, the computer 80 causes the end cutting tool to increase rotation angle $\theta_{y'}$ to obtain a lower attack angle between about 6°–12°. Furthermore, whenever substantial height difference in the Z axis is found between two adjacent flank segments along the cut profile, the computer 80 can accordingly increase the attack angle to follow the slope between the segments, providing better cut profile compliance. It is to be understood that further optimization of the cut parameter values can be initially carried out in order to enhance compliance of the programmed cut profile with the actual cut produced on the flank. Furthermore, environmental parameters such as flank storing temperature, flank freshness and slaughterhouse temperature shall be controlled to yield desired cut quality. Each cut flank 44 is fed at the end of the main conveyor 42 to the flank separation station 89 as better shown in FIG. 9, to completely separate the ribs portion 90 from the belly portion 91 after cutting operation. Operation control of the flank separation station 89 is carried out by the PLC 105 according to control signals received from input lines 80 and 80', as shown in FIG. 4. Upon feeding movement of the main conveyor 42, ribs portion 90 of a cut flank 44, being more rigid than the corresponding belly 91, follows a substantially horizontal forward movement to be received on the corresponding conveyor 92 being in its lowered position supported by abutments 119, for then leaving the apparatus at ribs output 156. The belly 91 of a cut flank 44 leaving the output end 71 of the main conveyor 42 reaches the upper edge of the falling guide plate 37 by gravity and upon downwardly pulling force applied by the hooks 43. The slots 69 allows the hooks to pass through the guiding plate while being withdrawn from the underneath surface of the belly 91. The separated belly portion is then received at the input end of the corresponding conveyor 94 in its raised position aligned with the adjacent output conveyor 94' to bring the cut belly portion out of the apparatus at the belly output 157. Whenever a defective or otherwise uncut flank is fed by the main conveyor 42, the conveyor 89 is caused by the PLC 105 to raise toward its upper position as shown in dotted lines, to allow the flank to fall directly onto the corresponding conveyor 94, which was previously moved to its lower position in support on the abutments 121, for dumping the rejected flank at an output 158 distinct from belly and ribs outputs 156 and 157.

It is to be understood that any obvious modification of the apparatus and method as described in the present patent specification is part of the present invention, provided it falls within the scope of the appended claims.

We claim:

1. An apparatus for removing ribs portion from belly of an animal flank, said apparatus comprising:
   transport means for carrying the flank with flank top surface showing ribs facing outwardly from an input of the apparatus toward an output thereof, said transport means being provided with means for holding the flank in position thereon;
   image sensing means for generating image electrical signals representing an image of the flank top surface;
   means for generating surface profile data characterizing the flank top surface;
   means for generating ribs thickness data for the ribs;
   processor means receiving said image electrical signals, said surface profile data and said ribs thickness data for deriving therefrom programmed cut data according to a predetermined meat thickness profile to be left under the ribs;
   robot means provided with a cutting means;
   controller means for said transport means and said robot means operable to produce relative movement between said cutting means and the flank according to said programmed cut data to allow removal of the ribs portion from the belly.

2. An apparatus according to claim 1, further comprising means for flattening the flank located at said apparatus input.

3. An apparatus according to claim 1, wherein said image sensing means comprise a camera disposed above said transport means.

4. An apparatus according to claim 3, wherein said camera is a fast framing camera having a field of vision scanning said flank top surface while the flank is carried by said transport means.

5. An apparatus according to claim 1, further comprising means to sense presence of the flank at said apparatus input to produce a presence indicating signal for said controller means, said transport means comprise an input conveyor station for substantially aligning a longitudinal axis of the flank according to a predetermined orientation and for synchronizing transfer of the flank to an input end of a main feeding conveyor comprised on said transport means whenever the presence indicating signal is received by said controller means.

6. An apparatus according to claim 5, wherein said predetermined orientation of the longitudinal axis of the flank is substantially parallel to a transport direction of said input conveyer station, said input conveyor station comprising a flank aligning device having a transversally displaceable guide member coupled to actuating means and longitudinally disposed over a first edge of a conveying surface of the conveyor station and a fixed guide member longitudinally disposed over a second edge of the conveying surface being opposed to said first displaceable guide member in a parallel spaced relationship to allow transport of the flank therealong on the conveying surface whenever the presence indicating signal is received by said controller means.

7. An apparatus as claimed in claim 5, wherein said holding means comprise gripping hooks secured to a conveying surface of said main feeding conveyor at a position providing gripping underneath a leading edge portion of the flank.

8. An apparatus as claimed in claim 1, wherein said ribs thickness data generating means comprise a camera disposed laterally of said main feeding conveyor adjacent the input end of said main feeding conveyor to provide further image electrical signals representing flank side surface showing ribs used to generate said ribs thickness data.

9. An apparatus according to claim 8, wherein said camera is a fast framing camera having a field of vision scanning said flank side surface showing ribs while the flank is carried by said transport means.

10. An apparatus as claimed in claim 1, wherein said ribs thickness data generating means comprise an X-ray unit including an X-ray generator having a gun disposed above said transport means and an X-ray detector aligned with the gun in a spaced relationship to provide an inspection area therebetween through which the flank is carried by said transport means, said X-ray detector producing X-ray image electrical signals, said ribs thickness data generating means further comprising processor means for deriving ribs width data from said X-ray image electrical signals, and for generating said ribs thickness data through predetermined mathematical relations.

11. An apparatus according to claim 1, wherein said cutting means is secured at a working free end of a robot arm provided on said robot means.

12. An apparatus according to claim 1, wherein said cutting means comprise a cutting tool provided with an elongated blade having a cutting edge.

13. An apparatus according to claim 12, further comprising means to measure stiffness of the flank to produce a stiffness indicative signal for the controller means, to vary a blade attack angle formed by said cutting edge and a flank transport direction according to said stiffness indicative signal.

14. An apparatus according to claim 12, wherein a portion of said cutting blade is outwardly curved in a plane substantially normal to said cutting edge to substantially comply with a corresponding first range of longitudinal curvature values for the ribs as part of said programmed cut data.

15. An apparatus according to claim 14, wherein said cutting tool is provided with at least one further elongated blade having a cutting edge, a portion of said cutting blade being outwardly curved in a plane substantially normal to said cutting edge to substantially comply with a corresponding further range of longitudinal curvature values for the ribs as part from said programmed cut data, said tool having means to displace a selected one of said elongated blades in a cutting position according to the programmed cut data.

16. An apparatus according to claim 1, wherein said transport means comprise an output conveyor station for separating the ribs portion from the belly after cutting to produce said removal.

17. An apparatus according to claim 1, wherein said means for generating profile data comprises laser source means for directing a beam of substantially monochromatic light at a first angle onto said flank top surface, said image sensing means receiving at a second angle reflected light from said flank top surface to generate further image electrical signals representing deviation of said reflected light onto said image sensing means, said processor means further deriving said profile data from said further image electrical signals through triangulation calculation of range between said reflecting flank top surface and said image sensing means.

18. A method for removing ribs portion from belly of an animal flank, said method comprising steps of:
   i) generating image electrical signals representing an image of a flank top surface showing ribs;
   ii) generating surface profile data characterizing the flank top surface;
   iii) generating ribs thickness data for the ribs;
   iv) deriving from said image electrical signals, said surface profile data and said ribs thickness data a programmed cut data according to a predetermined meat thickness profile to be left under the ribs; and
   v) cutting the flank according to said programmed cut data to allow removal of the ribs portion from the belly.

19. A method according to claim 18, wherein before said step i) there is a step of flattening said flank by applying pressure on said flank top surface showing ribs.

20. A method according to claim 18, wherein before said step iv) there are steps of:
   a) measuring stiffness of the flank to produce a stiffness indicative signal;
   b) deriving from said stiffness indicative signal cutting attack angle data;
   wherein said cutting step v) is performed according to said cutting attack angle data.

21. A method according to claim 18, wherein said programmed cut data are derived in step vi) through interpolation using the following relation:

$$zc_a = z_p zl_a - t_a - m$$

$z_p$ is a z coordinate value of reference image sensing plane in a reference Cartesian coordinates system XYZ;

$zl_a$ is a z coordinate value as part of the flank top surface profile data corresponding to a lowest surface point $(xl_a, yl_a, zl_a)$ of a flank transverse area, with a=1,A;

A is a number of transverse area distributed along said flank; $t_a$ is a mean rib thickness value derived from said ribs thickness data for a flank transverse area, with a=1,A;

m is a desired meat thickness derived from said predetermined meat thickness profile to be left under the ribs; and $zc_a$ is a z coordinate value corresponding to a point of the cut profile having coordinates $(xl, yl, zc_a)$.

22. A method as claimed in claim 21, wherein said programmed cut data are derived in step vi) considering sternum length of the flank, localization of two main muscles located on inner side of the flank, ribs curvature, position coordinates of cut starting point, position coordinates of cut ending point, flank tail length and flank carcass side indication.

23. A method according to claim 18, wherein said step ii) comprises steps of:
   a) directing a beam of substantially monochromatic light at a first angle onto said flank top surface,
   b) sensing at a second angle reflected light from said flank top surface to generate further image electrical signals representing deviation of said reflected light at a sensing reference plane; and
   c) deriving said profile data from said further image electrical signals through triangulation calculation of range between said reflecting flank top surface and said sensing reference plane.

24. A method as claimed in claim 18, wherein said step iii) comprises steps of:
   a) obtaining through image analysis said ribs thickness data for distinctly visible ones of said ribs; and
   b) deriving said ribs thickness data for each remaining ones of said ribs using one of a predetermined mathematical relation generating ribs thickness data for each said remaining ribs from said ribs thickness data for said distinctly visible ribs and reference statistical ribs thickness data for each said remaining ribs.

25. A method as claimed in claim 18, wherein said step iii) comprises steps of:
   a) obtaining through image analysis ribs width data for distinctly visible ones of said ribs; and
   b) deriving said ribs thickness data for said distinctly visible ribs using one of a predetermined mathematical relation generating ribs thickness data for each said distinctly visible ribs from said ribs width data for said distinctly visible ribs and reference statistical ribs thickness data for each said distinctly visible ribs; and
   c) deriving said ribs thickness data for each remaining ones of said ribs using one of a predetermined mathematical relation generating ribs thickness data for each said remaining ribs from said ribs width data for said distinctly visible ribs and reference statistical ribs thickness data for each said remaining ribs.

* * * * *